(12) United States Patent
Auerbach et al.

(10) Patent No.: US 10,496,942 B2
(45) Date of Patent: Dec. 3, 2019

(54) METHOD AND SYSTEM FOR AUTOMATED PROJECT MANAGEMENT OF EXCAVATION REQUESTS

(71) Applicant: P800X, LLC, Hackensack, NJ (US)

(72) Inventors: Samuel W. Auerbach, Langhorne, PA (US); Andrew S. Daniels, Philadelphia, PA (US); Daniel R. Urban, Langhorne, PA (US)

(73) Assignee: P800X, LLC, Hachensack, NJ (US)

( * ) Notice: Subject to any disclaimer, the term of this patent is extended or adjusted under 35 U.S.C. 154(b) by 658 days.

(21) Appl. No.: 15/155,249

(22) Filed: May 16, 2016

(65) Prior Publication Data

US 2016/0260048 A1    Sep. 8, 2016

Related U.S. Application Data

(63) Continuation-in-part of application No. 13/780,583, filed on Feb. 28, 2013, now Pat. No. 9,342,806.

(51) Int. Cl.

| | |
|---|---|
| *G06Q 10/06* | (2012.01) |
| *G06Q 30/04* | (2012.01) |
| *H04L 29/08* | (2006.01) |
| *G06F 16/951* | (2019.01) |
| *G06Q 50/08* | (2012.01) |
| *G06Q 50/06* | (2012.01) |

(52) U.S. Cl.
CPC ... *G06Q 10/063114* (2013.01); *G06F 16/951* (2019.01); *G06Q 30/04* (2013.01); *H04L 67/18* (2013.01); *G06Q 50/06* (2013.01); *G06Q 50/08* (2013.01)

(58) Field of Classification Search
CPC ......... G06Q 10/00; G06Q 40/06; G06F 17/60
USPC ....................................................... 705/7.15
See application file for complete search history.

(56) References Cited

U.S. PATENT DOCUMENTS

| | | |
|---|---|---|
| 4,674,056 A | 6/1987 | Goodfellow |
| 5,063,505 A | 11/1991 | Pate et al. |
| 5,696,906 A | 12/1997 | Peters et al. |
| 5,826,270 A | 10/1998 | Rutkowski et al. |
| 5,884,284 A | 3/1999 | Peters et al. |

(Continued)

OTHER PUBLICATIONS

Actsoft, "Solutions for Today's Mobile Resources" Aug. 2012 available at http://www.actsoft.com/wp-content/uploads/2012/08/Actsoft-Corporate-2012_v2.pdf.

(Continued)

*Primary Examiner* — Romain Jeanty
(74) *Attorney, Agent, or Firm* — Lesavich High-Tech Law Group, S.C.; Stephen Lesavich

(57) ABSTRACT

A method and system for method for automated work project management. The methods and systems described herein provide automated excavation mark-out verification of a user request to excavate at a desired location. User-defined excavation information is automatically verified and corrected if necessary. One or more municipalities and one or more owners of the existing underground utility infrastructure components are automatically notified of the request to excavate at the user-defined location. The method and system eliminate a need for a user to correctly determine all required information for user requested excavation, and reduces a possibility of the user requesting markings or excavating at a wrong location.

19 Claims, 20 Drawing Sheets

(56) References Cited

U.S. PATENT DOCUMENTS

| | | |
|---|---|---|
| 6,169,981 B1 | 1/2001 | Werbos |
| 6,343,290 B1 | 1/2002 | Harvey et al. |
| 6,519,568 B1 | 2/2003 | Yee et al. |
| 6,529,883 B1 | 3/2003 | Creamer et al. |
| 6,529,948 B1 | 3/2003 | Bowman-Amuah |
| 6,539,396 B1 | 3/2003 | Bowman-Amuah |
| 6,826,483 B1 | 11/2004 | Anderson et al. |
| 7,015,817 B2 | 3/2006 | Copley et al. |
| 7,050,808 B2 | 5/2006 | Janusz et al. |
| 7,227,081 B2 | 6/2007 | Bally et al. |
| 7,340,037 B1 | 3/2008 | Jean et al. |
| 7,369,968 B2 | 5/2008 | Johnson et al. |
| 7,386,377 B2 | 6/2008 | Sorensen |
| 7,425,679 B2 | 9/2008 | Kasten et al. |
| 7,640,105 B2 | 12/2009 | Nielsen et al. |
| 7,715,929 B2 | 5/2010 | Skourup et al. |
| 7,739,138 B2 | 6/2010 | Chauhan |
| 7,752,234 B2 | 7/2010 | Radel et al. |
| 7,869,944 B2 | 1/2011 | Deaton et al. |
| 7,957,322 B2 | 6/2011 | Reeves, III et al. |
| 7,986,246 B2 | 7/2011 | Angelis et al. |
| 8,010,640 B2 | 8/2011 | Aune et al. |
| 8,060,304 B2 | 11/2011 | Nielsen et al. |
| 8,069,412 B2 | 11/2011 | Bankston et al. |
| 8,082,267 B1 | 12/2011 | Murphy et al. |
| 8,121,741 B2 | 2/2012 | Taft et al. |
| 8,150,554 B2 | 4/2012 | Anderson |
| 8,155,390 B2 | 4/2012 | Nielsen et al. |
| 8,194,932 B2 | 6/2012 | Nielsen et al. |
| 8,218,827 B2 | 7/2012 | Nielsen et al. |
| 8,249,306 B2 | 8/2012 | Nielsen et al. |
| 8,260,489 B2 | 9/2012 | Nielsen et al. |
| 8,265,344 B2 | 9/2012 | Nielsen et al. |
| 8,269,649 B2 | 9/2012 | Cornwall |
| 8,270,666 B2 | 9/2012 | Nielsen et al. |
| 8,280,117 B2 | 10/2012 | Nielsen et al. |
| 8,280,631 B2 | 10/2012 | Nielsen et al. |
| 8,280,969 B2 | 10/2012 | Nielsen et al. |
| 8,290,204 B2 | 10/2012 | Nielsen et al. |
| 8,290,215 B2 | 10/2012 | Nielsen et al. |
| 8,296,308 B2 | 10/2012 | Nielsen et al. |
| 8,300,895 B2 | 10/2012 | Nielsen et al. |
| 8,301,380 B2 | 10/2012 | Nielsen et al. |
| 8,311,765 B2 | 11/2012 | Nielsen et al. |
| 8,321,253 B2 | 11/2012 | Mitchell et al. |
| 8,321,365 B2 | 11/2012 | Anderson |
| 8,340,359 B2 | 12/2012 | Nielsen et al. |
| 8,355,542 B2 | 1/2013 | Nielsen et al. |
| 8,356,255 B2 | 1/2013 | Nielsen et al. |
| 8,361,543 B2 | 1/2013 | Nielsen et al. |
| 8,374,789 B2 | 2/2013 | Nielsen et al. |
| 8,384,742 B2 | 2/2013 | Nielsen et al. |
| 8,386,178 B2 | 2/2013 | Nielsen et al. |
| 8,400,155 B2 | 3/2013 | Nielsen et al. |
| 8,401,791 B2 | 3/2013 | Nielsen et al. |
| 8,407,001 B2 | 3/2013 | Nielsen et al. |
| 8,416,995 B2 | 4/2013 | Nielsen et al. |
| 8,423,637 B2 | 4/2013 | Vaswani et al. |
| 8,424,486 B2 | 4/2013 | Nielsen et al. |
| 8,437,879 B2 | 5/2013 | Anderson |
| 8,457,893 B2 | 6/2013 | Nielsen et al. |
| 8,462,014 B1 | 6/2013 | Kardos et al. |
| 8,463,487 B2 | 6/2013 | Nielsen et al. |
| 8,463,765 B2 | 6/2013 | Lesavich |
| 8,467,932 B2 | 6/2013 | Nielsen et al. |
| 8,467,969 B2 | 6/2013 | Nielsen et al. |
| 8,468,206 B2 | 6/2013 | Nielsen et al. |
| 8,473,148 B2 | 6/2013 | Nielsen et al. |
| 8,473,209 B2 | 6/2013 | Nielsen et al. |
| 8,476,906 B2 | 7/2013 | Nielsen et al. |
| 8,478,523 B2 | 7/2013 | Nielsen et al. |
| 8,478,524 B2 | 7/2013 | Nielsen et al. |
| 8,478,525 B2 | 7/2013 | Nielsen et al. |
| 8,478,617 B2 | 7/2013 | Nielsen et al. |
| 8,478,635 B2 | 7/2013 | Nielsen et al. |
| 8,478,714 B2 | 7/2013 | Floyd et al. |
| 8,480,332 B2 | 7/2013 | Miller |
| 8,484,300 B2 | 7/2013 | Nielsen et al. |
| 8,510,141 B2 | 8/2013 | Nielsen et al. |
| 8,527,308 B2 | 9/2013 | Nielsen et al. |
| 8,532,341 B2 | 9/2013 | Nielsen et al. |
| 8,532,342 B2 | 9/2013 | Nielsen et al. |
| 8,532,488 B2 | 9/2013 | Nielsen et al. |
| 8,533,675 B2 | 9/2013 | Duggal et al. |
| 8,543,003 B2 | 9/2013 | Nielsen et al. |
| 8,543,651 B2 | 9/2013 | Nielsen et al. |
| 8,543,937 B2 | 9/2013 | Nielsen et al. |
| 8,549,084 B2 | 10/2013 | Nielsen et al. |
| 8,555,288 B2 | 10/2013 | Brown et al. |
| 8,560,164 B2 | 10/2013 | Nielsen et al. |
| 8,566,737 B2 | 10/2013 | Nielsen et al. |
| 8,572,193 B2 | 10/2013 | Nielsen et al. |
| 8,577,623 B2 | 11/2013 | Wolfe |
| 8,577,707 B2 | 11/2013 | Nielsen et al. |
| 8,578,437 B2 | 11/2013 | Nielsen et al. |
| 8,583,264 B2 | 11/2013 | Nielsen et al. |
| 8,583,372 B2 | 11/2013 | Nielsen et al. |
| 8,584,510 B2 | 11/2013 | Nielsen et al. |
| 8,589,201 B2 | 11/2013 | Nielsen et al. |
| 8,589,202 B2 | 11/2013 | Nielsen et al. |
| 8,600,526 B2 | 12/2013 | Nielsen et al. |
| 8,600,556 B2 | 12/2013 | Nesler et al. |
| 8,600,848 B2 | 12/2013 | Nielsen et al. |
| 8,612,090 B2 | 12/2013 | Nielsen et al. |
| 8,612,148 B2 | 12/2013 | Nielsen et al. |
| 8,612,271 B2 | 12/2013 | Nielsen et al. |
| 8,612,276 B1 | 12/2013 | Nielsen et al. |
| 8,620,572 B2 | 12/2013 | Nielsen et al. |
| 8,620,587 B2 | 12/2013 | Nielsen et al. |
| 8,620,616 B2 | 12/2013 | Nielsen et al. |
| 8,620,726 B2 | 12/2013 | Nielsen et al. |
| 8,626,571 B2 | 1/2014 | Nielsen et al. |
| 8,630,463 B2 | 1/2014 | Nielsen et al. |
| 8,644,965 B2 | 2/2014 | Nielsen et al. |
| 8,650,606 B2 | 2/2014 | Nielsen et al. |
| 8,674,843 B2 | 3/2014 | Bhageria et al. |
| 8,700,325 B2 | 4/2014 | Nielsen et al. |
| 8,712,596 B2 | 4/2014 | Scott |
| 8,731,724 B2 | 5/2014 | Drees et al. |
| 8,731,830 B2 | 5/2014 | Nielsen et al. |
| 8,731,999 B2 | 5/2014 | Nielsen et al. |
| 8,749,239 B2 | 6/2014 | Nielsen et al. |
| 8,766,638 B2 | 7/2014 | Nielsen et al. |
| 8,770,140 B2 | 7/2014 | Nielsen et al. |
| 8,775,077 B2 | 7/2014 | Nielsen et al. |
| 8,805,640 B2 | 8/2014 | Nielsen et al. |
| 8,806,559 B2 | 8/2014 | Nielsen et al. |
| 8,811,191 B2 | 8/2014 | Nielsen et al. |
| 8,830,265 B2 | 9/2014 | Nielsen et al. |
| 8,832,565 B2 | 9/2014 | Nielsen et al. |
| 8,977,558 B2 | 3/2015 | Nielsen |
| 9,037,564 B2 | 5/2015 | Lesavich et al. |
| 9,137,250 B2 | 9/2015 | Lesavich et al. |
| 9,342,806 B2 | 5/2016 | Urban |
| 9,361,479 B2 | 6/2016 | Lesavich |
| 9,569,771 B2 | 2/2017 | Lesavich |
| 2002/0101512 A1 | 8/2002 | Klapman |
| 2002/0116496 A1 | 8/2002 | Lew et al. |
| 2002/0116645 A1 | 8/2002 | Cloutier et al. |
| 2002/0116655 A1 | 8/2002 | Lew et al. |
| 2003/0028410 A1 | 2/2003 | House et al. |
| 2004/0044554 A1 | 3/2004 | Bull et al. |
| 2004/0093825 A1 | 5/2004 | Lee |
| 2004/0167670 A1 | 8/2004 | Goncalves |
| 2004/0221353 A1 | 11/2004 | Kennard |
| 2004/0236620 A1 | 11/2004 | Chauhan et al. |
| 2004/0243525 A1 | 12/2004 | Forrester |
| 2004/0258105 A1 | 12/2004 | Spathas et al. |
| 2005/0081188 A1 | 4/2005 | Kumar et al. |
| 2005/0119930 A1 | 6/2005 | Smith |
| 2005/0167139 A1 | 8/2005 | Bally |
| 2005/0171853 A1 | 8/2005 | Fettig et al. |
| 2005/0197847 A1 | 9/2005 | Smith |
| 2005/0267898 A1 | 12/2005 | Simon et al. |

(56) References Cited

U.S. PATENT DOCUMENTS

| | | |
|---|---|---|
| 2006/0161646 A1 | 7/2006 | Chene et al. |
| 2006/0229779 A1 | 10/2006 | Sorenson |
| 2006/0235611 A1 | 10/2006 | Deaton et al. |
| 2006/0241793 A1 | 10/2006 | Skourup et al. |
| 2007/0010914 A1 | 1/2007 | Johnson et al. |
| 2007/0022668 A1 | 2/2007 | Kasten et al. |
| 2007/0085701 A1 | 4/2007 | Walters et al. |
| 2007/0086624 A1 | 4/2007 | Breed |
| 2007/0107354 A1 | 5/2007 | Chartier |
| 2007/0124189 A1 | 5/2007 | Stoughton et al. |
| 2007/0180150 A1 | 8/2007 | Eisner et al. |
| 2007/0183318 A1 | 8/2007 | Johnson et al. |
| 2007/0183369 A1 | 8/2007 | Angelis |
| 2007/0244774 A1 | 10/2007 | Deibler |
| 2007/0247331 A1 | 10/2007 | Angelis et al. |
| 2007/0247789 A1 | 10/2007 | Benson et al. |
| 2007/0270164 A1 | 11/2007 | Maier et al. |
| 2007/0271570 A1 | 11/2007 | Brown et al. |
| 2008/0056279 A1 | 3/2008 | Lund |
| 2008/0059411 A1* | 3/2008 | Greiner .......... G06Q 10/06 |
| 2008/0092061 A1 | 4/2008 | Bankston et al. |
| 2008/0177678 A1 | 7/2008 | De Martini et al. |
| 2008/0187116 A1 | 8/2008 | Reeves et al. |
| 2008/0234889 A1 | 9/2008 | Sorensen |
| 2008/0243687 A1 | 10/2008 | Johnson et al. |
| 2008/0282299 A1 | 11/2008 | Koat et al. |
| 2009/0089209 A1 | 4/2009 | Bixler et al. |
| 2009/0234699 A1* | 9/2009 | Steinglass .......... G06Q 10/06 705/7.23 |
| 2009/0303547 A1 | 12/2009 | Kurihara |
| 2009/0327024 A1 | 12/2009 | Nielsen et al. |
| 2011/0004830 A1 | 1/2011 | Von Kaenel et al. |
| 2011/0035328 A1* | 2/2011 | Nielsen .......... G06Q 10/06 705/342 |
| 2011/0078041 A1 | 3/2011 | Barker |
| 2011/0145155 A1 | 6/2011 | Walter et al. |
| 2011/0161124 A1 | 6/2011 | Lappinga et al. |
| 2011/0178937 A1 | 7/2011 | Bowman |
| 2011/0208366 A1 | 8/2011 | Taft |
| 2011/0208710 A1 | 8/2011 | Lesavich et al. |
| 2011/0246534 A1 | 10/2011 | Simon |
| 2011/0252420 A1 | 10/2011 | Tung et al. |
| 2011/0288692 A1 | 11/2011 | Scott |
| 2011/0295730 A1 | 12/2011 | Vaswani et al. |
| 2012/0019396 A1 | 1/2012 | Cornwall |
| 2012/0022700 A1 | 1/2012 | Drees et al. |
| 2012/0023193 A1 | 1/2012 | Eisner et al. |
| 2012/0036250 A1 | 2/2012 | Vaswani et al. |
| 2012/0065944 A1 | 3/2012 | Nielsen et al. |
| 2012/0066137 A1* | 3/2012 | Nielsen .......... G06Q 10/06 705/317 |
| 2012/0078680 A1 | 3/2012 | Tharp |
| 2012/0084172 A1 | 4/2012 | Lee et al. |
| 2012/0191665 A1 | 6/2012 | Floyd et al. |
| 2012/0209584 A1 | 8/2012 | Floyd et al. |
| 2012/0240243 A1 | 9/2012 | Allardyce |
| 2012/0253539 A1 | 10/2012 | McMullin |
| 2012/0265358 A1 | 10/2012 | Thoppay et al. |
| 2012/0278622 A1 | 11/2012 | Lesavich et al. |
| 2012/0290390 A1 | 11/2012 | Harman |
| 2012/0328162 A1 | 12/2012 | Nielsen et al. |
| 2012/0330710 A1 | 12/2012 | Hauser et al. |
| 2012/0330849 A1 | 12/2012 | Nielsen et al. |
| 2013/0006718 A1* | 1/2013 | Nielsen .......... G06Q 10/06312 705/7.42 |
| 2013/0013259 A1 | 1/2013 | Wolfe |
| 2013/0022953 A1 | 1/2013 | Van der Linden et al. |
| 2013/0060591 A1 | 3/2013 | Meegan |
| 2013/0063272 A1 | 3/2013 | Bhageria et al. |
| 2013/0066481 A1 | 3/2013 | Bhageria et al. |
| 2013/0090089 A1 | 4/2013 | Rivere |
| 2013/0090965 A1 | 4/2013 | Rivere |
| 2013/0090969 A1 | 4/2013 | Rivere |
| 2013/0103451 A1* | 4/2013 | Cockburn .......... E02F 9/2054 705/7.23 |
| 2013/0181845 A1 | 7/2013 | Johnson |
| 2013/0204872 A1 | 8/2013 | Runchey |
| 2013/0229947 A1 | 9/2013 | Vaswani et al. |
| 2013/0238140 A1 | 9/2013 | Malchiondo et al. |
| 2013/0325402 A1 | 12/2013 | Vukojevic et al. |
| 2013/0339980 A1 | 12/2013 | Meshar et al. |
| 2013/0342358 A1 | 12/2013 | Kardos et al. |
| 2014/0006125 A1 | 1/2014 | Meegan |
| 2014/0006377 A1 | 1/2014 | Astore |
| 2014/0077950 A1 | 3/2014 | Rudaitis et al. |
| 2014/0156097 A1 | 6/2014 | Nesler et al. |
| 2014/0163925 A1 | 6/2014 | Wolfe |
| 2014/0164603 A1 | 6/2014 | Castel et al. |
| 2014/0189792 A1 | 7/2014 | Lesavich et al. |
| 2014/0244329 A1 | 8/2014 | Urban |
| 2014/0267776 A1 | 9/2014 | Duthu |
| 2015/0066624 A1 | 3/2015 | Astore |
| 2015/0066673 A1 | 3/2015 | Astore |
| 2015/0066689 A1 | 3/2015 | Astore |
| 2015/0066692 A1 | 3/2015 | Astore |
| 2015/0379031 A1 | 12/2015 | Lesavich et al. |
| 2015/0379301 A1 | 12/2015 | Lesavich et al. |
| 2016/0321654 A1 | 11/2016 | Lesavich et al. |

OTHER PUBLICATIONS

ClickSoftware, "Field Service Management, Employee Location Tracking, Xora" 2016 available at http://smart.clicksoftware.com/products/overview/products-features/.

* cited by examiner

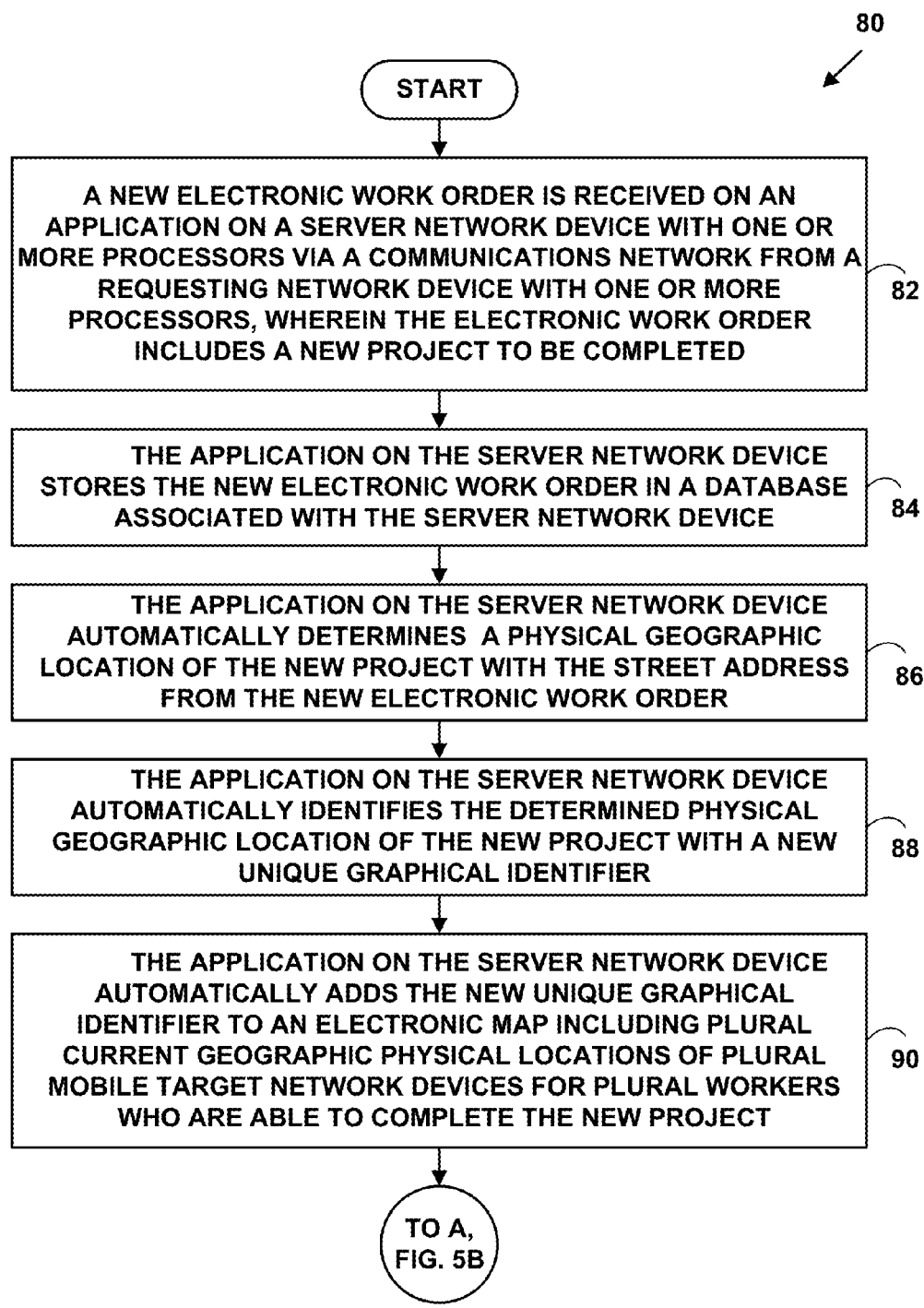

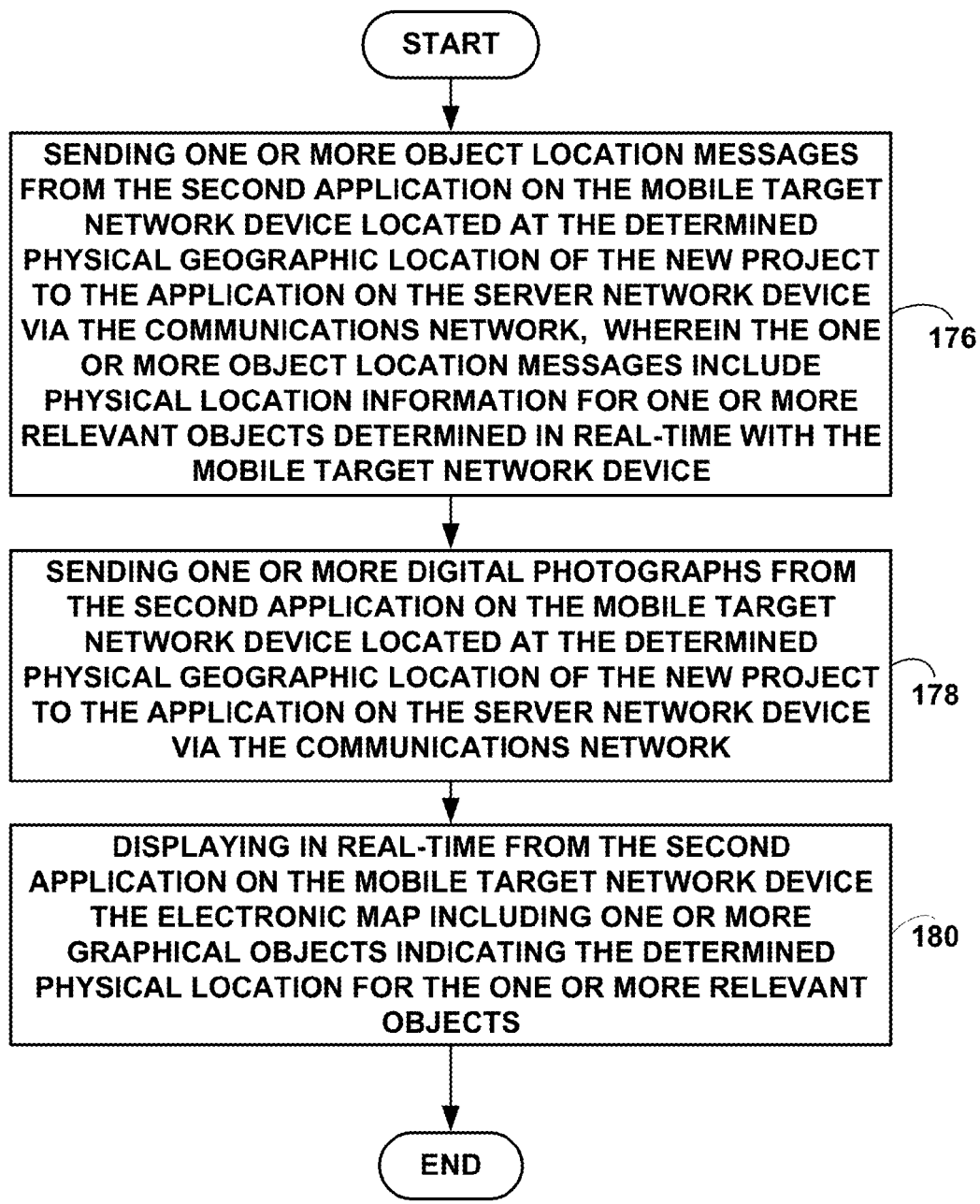

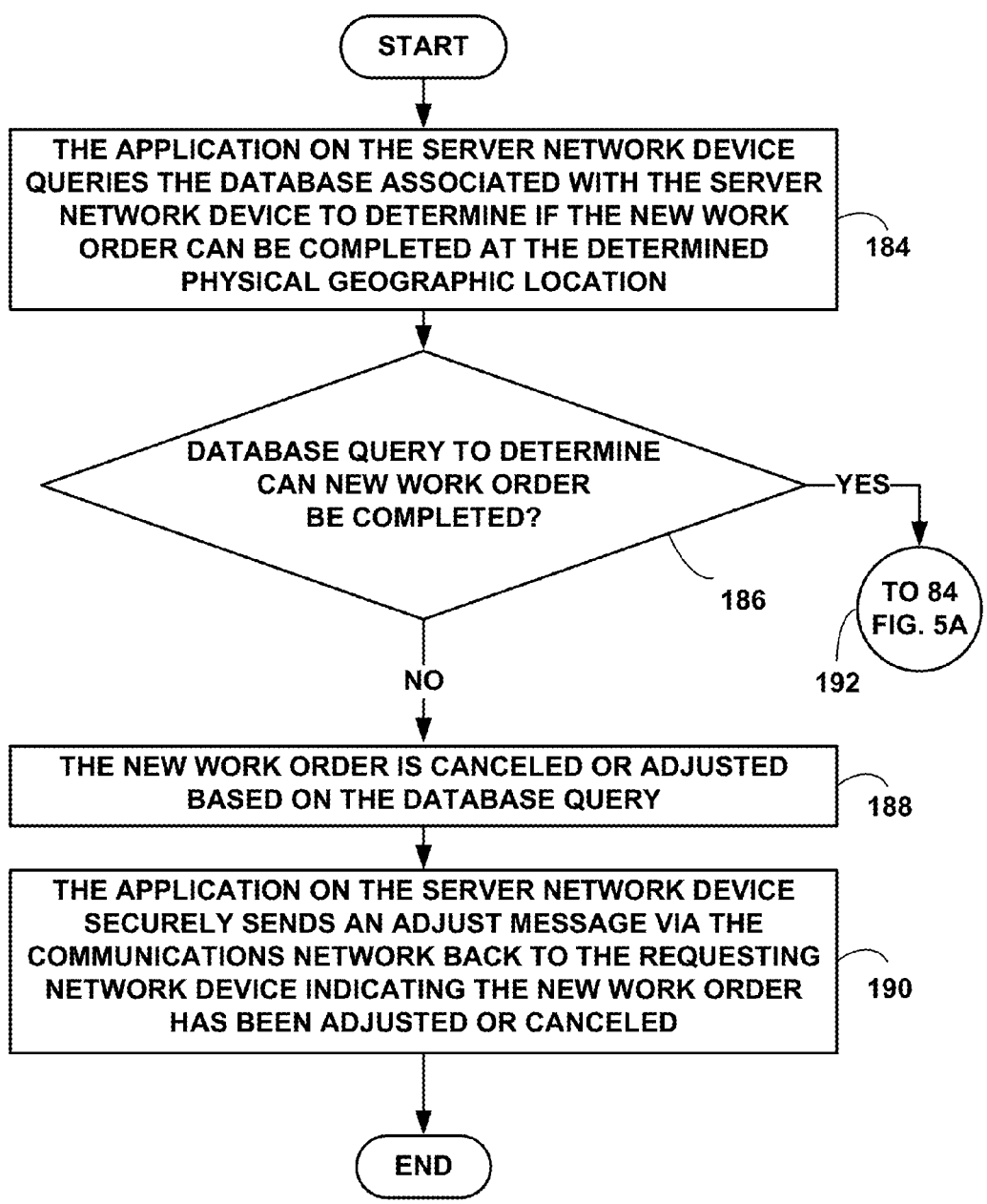

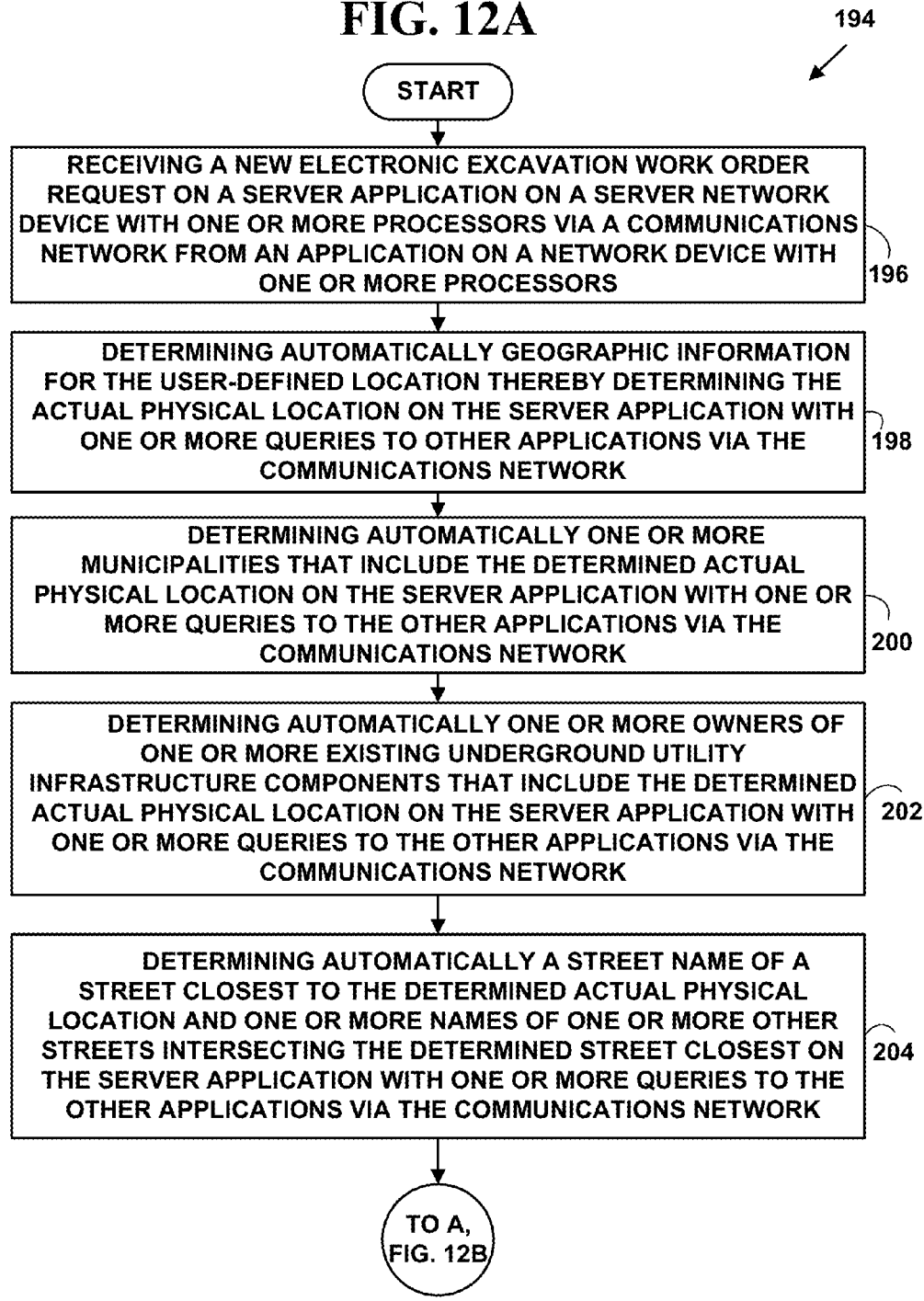

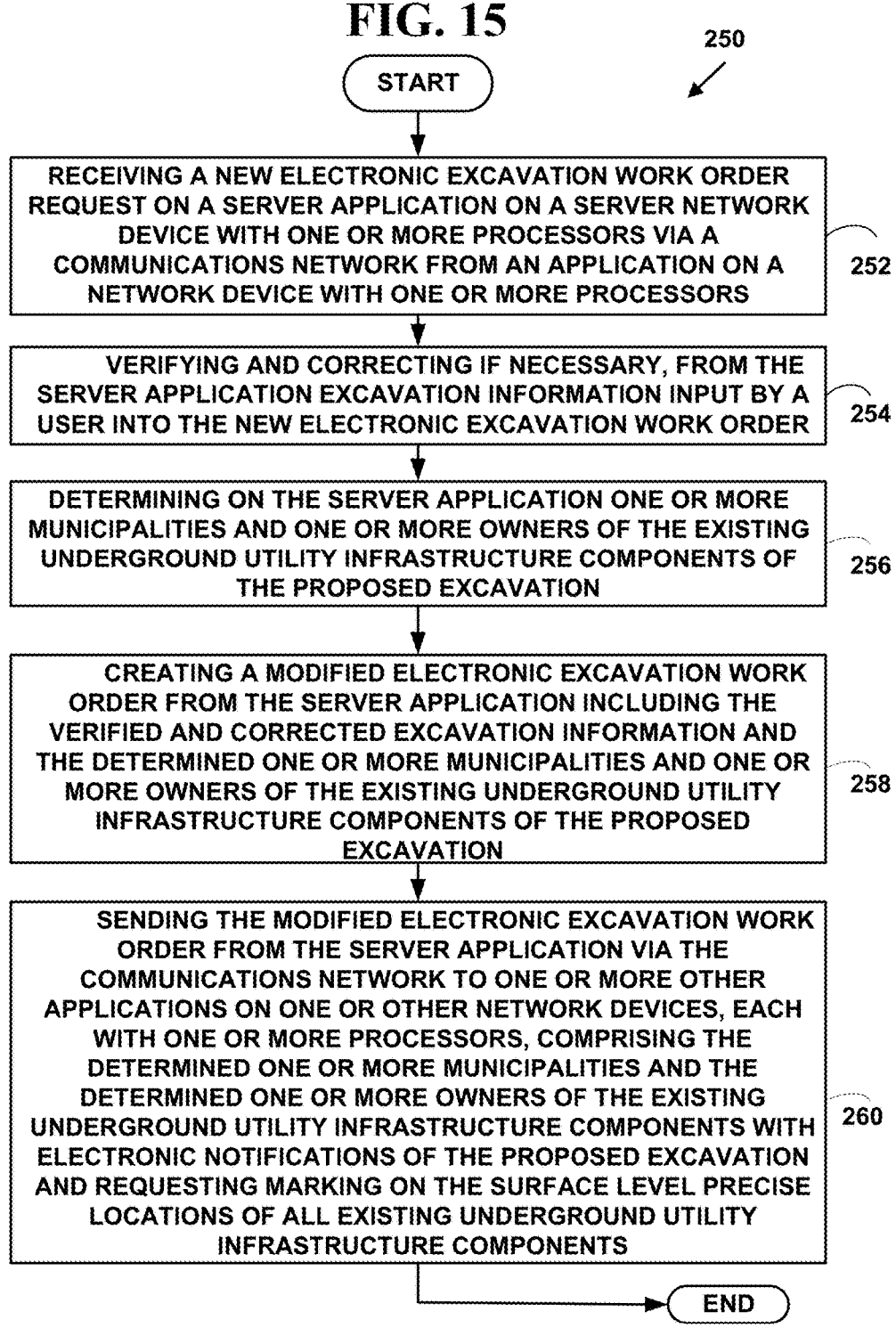

METHOD AND SYSTEM FOR AUTOMATED PROJECT MANAGEMENT OF EXCAVATION REQUESTS

CROSS REFERENCES TO RELATED APPLICATIONS

This U.S. utility patent application is a continuation-in-part (CIP) of U.S. utility patent application Ser. No. 13/780,583, filed on Feb. 28, 2013, that issued into U.S. Pat. No. 9,342,806, on May 17, 2016, the contents of all of which are incorporated by reference.

FIELD OF THE INVENTION

This invention relates to project management of excavation requests. More specifically, it relates to a method and system for automated work project management including automated excavation mark-out verification.

BACKGROUND OF THE INVENTION

The are many service business, such as telephone line installation, cable television cable installation, new construction, maintenance projects, lawn care projects, landscaping projects, handyman services, home improvement services, delivery services, janitorial and cleaning projects that require accept a new job and dispatching workers to complete the new job.

There are many problems associated with dispatching such workers. One problem is that it is difficult to find a worker who is currently geographically closet to a new work location.

Another problem is that it is difficult to estimate how long it will take a worker to physically arrive at a new work location. Another problem is that it is difficult to monitor how many hours a worker actually spend on the new work project.

Another problem is that it is difficult to confirm that a worker has actually completed a new work product. Another problem is that it is difficult to confirm that a requirements of a new work project are correct for a given physical geographic location. For example, if a new work project included a request to maintain overhead telephone wires and the wires were actually underground and not overhead, the new work project should be canceled or adjusted.

Another problem is that it is difficult to timely send out an invoice when a new work project has been completed. Another problem is that it is difficult to have workers who are working on a new work project to update additions or removals of physical objects such as utility poles, wires, etc.

Another problem is that when excavation is required an excavator makes an excavation request and is typically required to manually provide information about the excavation site and manually select the site on a map. This often leads to errors where permission to excavate is granted at a wrong location and/or underground infrastructure components are not properly marked before excavation.

For example, the State New Jersey has recently established a One-Call Damage Prevention System (see e.g., N.J.S.A. 48:2-73 et seq. and enabling rules—N.J.A.C. 14:2). All operators of underground facilities are required to participate in the One-Call Prevention System. In addition, all excavators are required to notify the One-Call Damage Prevention System prior to any excavation activity.

All fifty States and most Canadian Provinces have similar laws, regulations, procedures and One Call Centers. Because the One-Call Damage Prevention System covers the entire United States, it has become part of the standard operating procedure for all excavators. Therefore, anything that can be done to ensure that an excavation mark-out is completed correctly and in a timely manner benefits the state and local governments as well as excavators.

As an example, the State of New Jersey has established a One Call Center (OCC) to function as the central point of contact and communications between the excavator and the underground utility operator. An excavator is required to contact the OCC and provide very specific information concerning the proposed excavation. This information is generally referred to as the "mark-out request." The purpose of the mark-out request is to ensure all excavation is correctly identified and its physical relationship to underground infrastructure components can be determined and properly marked-out on a surface level.

The OCC accepts the mark-out request and creates an electronic ticket. The electronic ticket is forwarded to the various underground utility operators that may be impacted by the excavation. The utility operators are required to physically mark the location of the underground facilities in the field on a surface level.

There are a number of was to submit a mark out request to an OCC. In New Jersey, one of the methods is using the NJOCC ITIC web portal. The ITIC allows an excavator to fill out the request on line. The excavator logs into the ITIC web site, manually fills out the information required including a location for the excavation and manually picks map grids that overlay the location where the excavation is proposed. Errors can and do occur at with such manual entry of excavation data.

Thus, it is desirable to solve some of these and other problems associated with project management including excavation requests.

SUMMARY OF THE INVENTION

In accordance with preferred embodiments of the present invention, some of the problems associated with are overcome. A method and system for automated work project management presented including automated excavation mark-out verification.

The methods and systems described herein provide automated excavation mark-out verification of a user request to excavate at a desired location. User-defined excavation information is automatically verified and corrected if necessary. One or more municipalities and one or more owners of the existing underground utility infrastructure components are automatically notified of the user request to excavate at the user-defined location. The method and system eliminate a need for a user to correctly determine all required information for user requested excavation, and reduces a possibility of the user requesting markings or excavating at a wrong location.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 5A-5D are a flow diagram for a method for automated work project management;

FIG. 10 is a flow diagram illustrating a method for automated work project management;

FIG. 11 is a flow diagram illustrating a method for automated work project management;

FIGS. 12A, 12B, and 12C are a flow diagram illustrating a method for automated project management excavation mark-out verification;

FIG. 15 is a flow diagram illustrating a method for automated project management excavation mark-out verification.

DETAILED DESCRIPTION OF THE INVENTION

Figure 1:
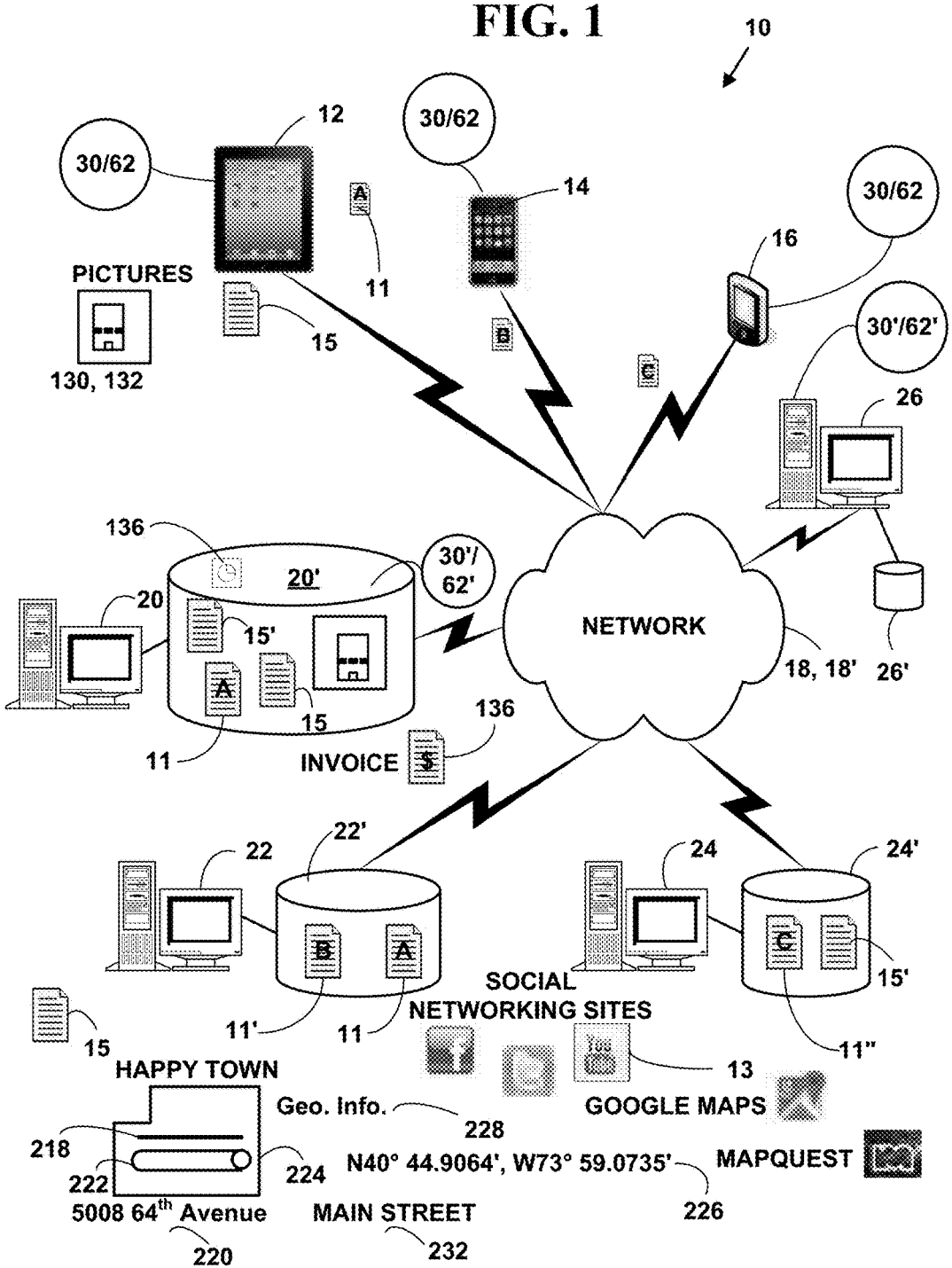
FIG. 1 is a block diagram illustrating an exemplary electronic information display system.

FIG. 1 is a block diagram illustrating an exemplary electronic information system 10. The exemplary electronic system 10 includes, but is not limited to, one or more target network devices 12, 14, 16 (only three of which are illustrated) each with one or more processors and a computer readable medium.

The one or more target network devices 12, 14, 16 include, but are not limited to, multimedia capable desktop and laptop computers, tablet computers, facsimile machines, mobile phones, non-mobile phones, smart phones, Internet phones, Internet appliances, personal digital/data assistants (PDA), two-way pagers, digital cameras, portable game consoles (PLAY STATION PORTABLE by SONY, GAME BOY by SONY, NINTENDO DSI, etc.), non-portable game consoles (XBOX by MICROSOFT, PLAY STATION by SONY, WII by NINTENDO, etc.), cable television (CATV) set-top boxes, digital televisions including high definition television (HDTV), three-dimensional (3D) televisions and other types of network devices.

The one or more smart network devices 12, 14, 16 also include smart phones such as the IPHONE by APPLE, Inc., BLACKBERRY STORM and other BLACKBERRY models by RESEARCH IN MOTION, Inc. (RIM), DROID by MOTOROLA, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as JAVA ME, a smart phone usually allows the user to install and run more advanced applications. Smart phones and/or tablet computers run complete operating system software providing a platform for application developers.

The operating systems include the IPHONE OS, ANDROID, WINDOWS, etc. IPHONE OS is a proprietary operating system for the APPLE IPHONE. ANDRIOD is an open source operating system platform backed by Google, along with major hardware and software developers (such as INTEL, HTC, ARM, MOTOROLA and SAMSUNG, etc.), that form the Open Handset Alliance.

The one or more smart network devices 12, 14, 16 also include tablet computers such as the IPAD, by APPLE, Inc., the HP TABLET, by HEWLETT PACKARD, Inc., the PLAYBOOK, by RIM, Inc., the TABLET, by SONY, Inc.

The target network devices 12, 14, 16 are in communications with a communications network 18 via one or more wired and/or wireless communications interfaces. The communications network 18 includes, but is not limited to, communications over a wire connected to the target network devices, wireless communications, and other types of communications using one or more communications and/or networking protocols. In one embodiment, the communications network 18 also includes a cloud communications network 18'.

Plural server network devices 20, 22, 24, 26 (only four of which are illustrated) each with one or more processors and a computer readable medium include one or more associated databases 20', 22', 24', 26'. The plural network devices 20, 22, 24, 26 are in communications with the one or more target devices 12, 14, 16 via the cloud communications network 18'.

The plural server network devices 20, 22, 24 26, include, but are not limited to, World Wide Web servers, Internet servers, search engine servers, electronic information display servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for information providers, etc.

The communications network 18 includes, but is not limited to, a wired and/or wireless communications network comprising: the Internet, an intranet, a Local Area Network (LAN), a LAN (WiLAN), a Wide Area Network (WAN), a Metropolitan Area Network (MAN), wireless personal area network (WPAN), Wireless Fidelity Network (Wi-Fi), Worldwide Interoperability for Microwave Access Network (WiMAX), a Public Switched Telephone Network (PSTN), a cloud communications network 18' and/or other types of wired and/or wireless communications networks 18.

The communications network 18 may include one or more gateways, routers, bridges and/or switches. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Wireless Interfaces

In one embodiment of the present invention, the wireless interfaces on network devices 12, 14, 16, 20, 22, 24, 26 include but are not limited to, 3G and/or 4G IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN) or "RF Home" wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

As is known in the art, Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the domain name "www.weca.net."

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the domain name "www.ieee802.org" and "www.zigbee.org" respectively.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the domain name "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the domain name "www.etsi.org." ETSI HIPERMAN can be used to provide a WLP.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18'.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) including HDTV that connect the network devices 12, 14, 16, 20, 22, 24, 26 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum. However, network devices based on other standards could also be used.

Exemplary Information Display System

Figure 2:
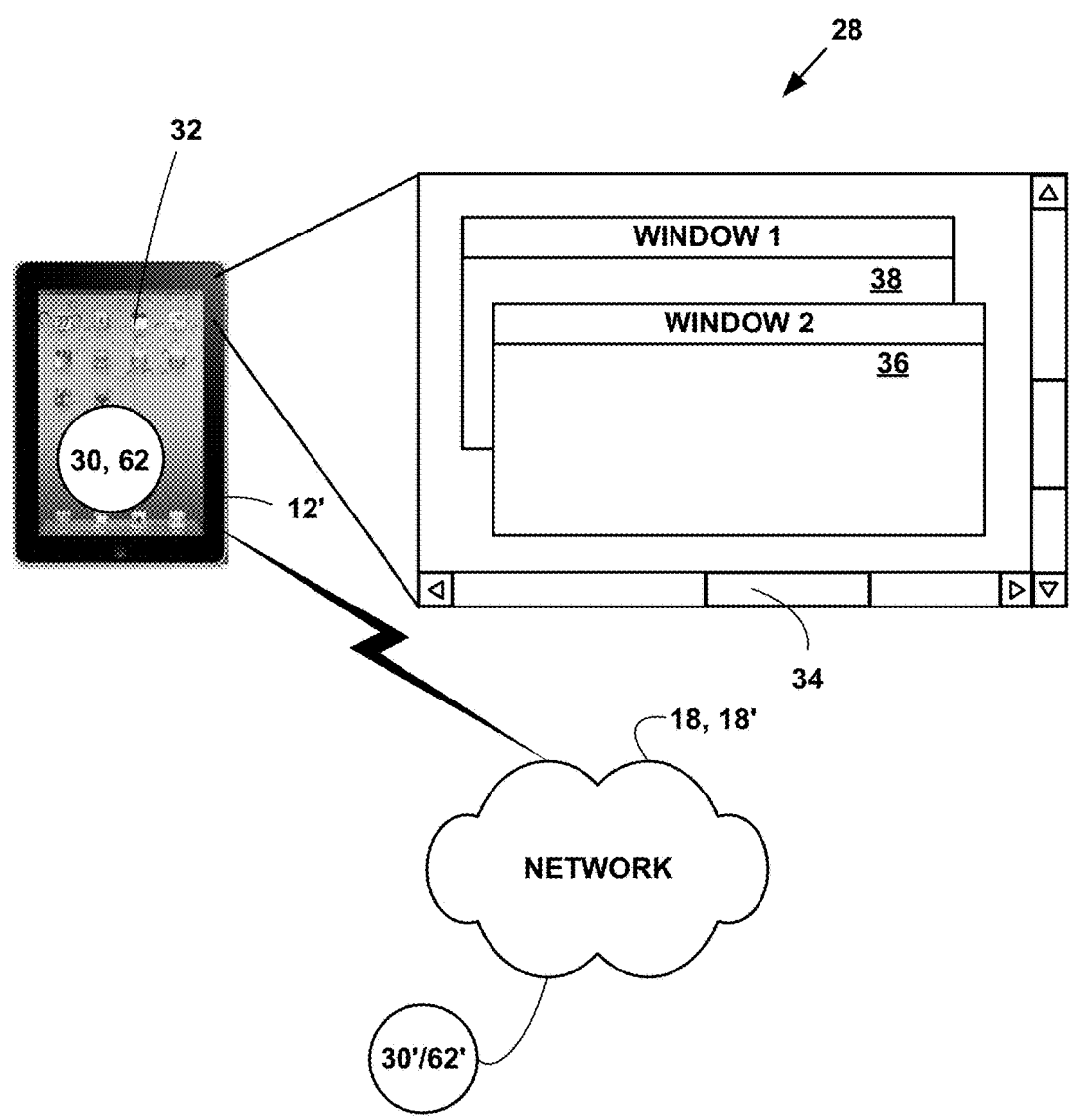
FIG. 2 is a block diagram illustrating an exemplary electronic information display system.

FIG. 2 is a block diagram illustrating an exemplary electronic information display system 28. The exemplary electronic information system display system includes, but is not limited to a target network device (e.g., computer 12', etc.) with an application 30 and a display component 32. The application 30 presents a graphical user interface (GUI) 34 on the display 32 component. The GUI 32 presents a multi-window 36, 38, interface to a user.

In one embodiment of the invention, the application 30 is a software application. However, the present invention is not limited to this embodiment and the application 30 can be hardware, firmware, hardware and/or any combination thereof. In one embodiment, the application 30 includes a cloud computing application 62. In another embodiment, the application 30/62 includes a smart phone application for a smart phone or a tablet computer. However, the present invention is not limited these embodiments and other embodiments can be used to practice the invention In another embodiment, a portion of the application 30 is executing on the target network devices 12, 14, 16 and another portion of the application 30/62 is executing on the server network devices 20, 22, 24, 26. However, the present invention is not limited these embodiments and other embodiments can be used to practice the invention.

Exemplary Networking Protocol Stack

Figure 3:
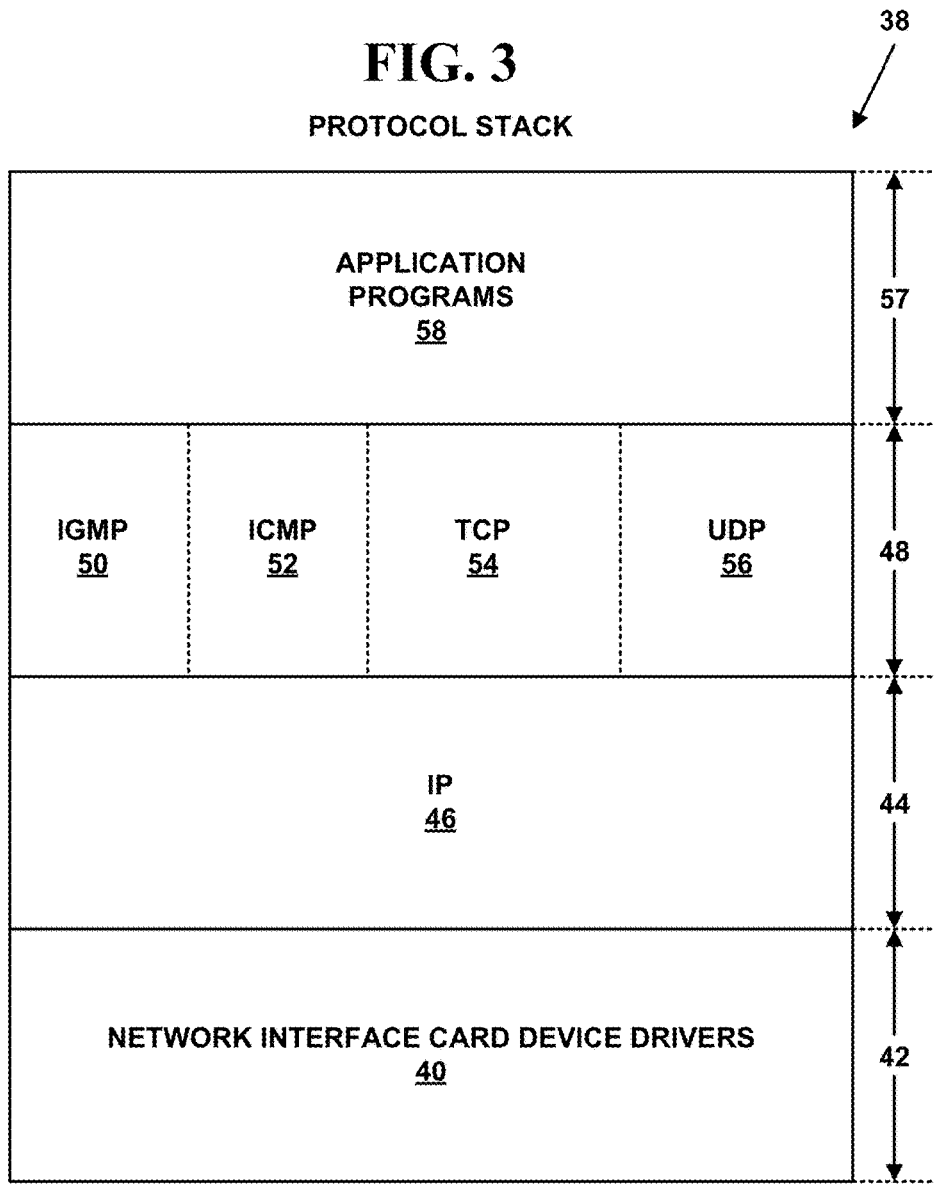
FIG. 3 is a block diagram illustrating an exemplary networking protocol stack.

FIG. 3 a block diagram illustrating a layered protocol stack 38 for network devices in the electronic information display system 10. The layered protocol stack 38 is described with respect to Internet Protocol (IP) suites comprising in general from lowest-to-highest, a link 42, network 44, transport 48 and application 56 layer. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer.).

The network devices 12, 14, 16, 20, 22, 24, 26 are connected to the communication network 18 with Network Interface Card (NIC) device drivers 40 in a link layer 42 for the actual hardware connecting the network devices 12, 14, 16, 20, 22, 24, 26 to the communications network 18. For example, the NIC device drivers 40 may include a serial port device driver, a modem device driver, an Ethernet device driver, a wireless device driver, a wired device driver, etc. The device drivers interface with the actual hardware being used to connect the network devices to the communications network 18.

Media Access Control (MAC) is a data link layer 42 protocol. A MAC address is a physical address of a device connected to a communications network, expressed as a 48-bit hexadecimal number. A MAC address is permanently assigned to each unit of most types of networking hardware, such as network interface cards (NICs), by manufacturers at the factory.

Above the link layer 42 is a network layer 44 (also called the Internet Layer for Internet Protocol suites). The network layer 44 includes, but is not limited to, an IP layer 46. However, more fewer or other protocols can also be used in the network layer 44, and the present invention is not limited to IP 46.

IP 46 is an addressing protocol designed to route traffic within a network or between networks. For more information on IP 46 see IETF Request For Comments (RFC)-791, incorporated herein by reference. An IP address includes four sets of numbers divided by period (e.g., x.x.x.x) in the range of zero to 255. An IP address is a unique string of numbers that identifies a device on an IP based network.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 54 and a User Datagram Protocol (UDP) layer 56. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 62, 64, etc.) to carry out desired functionality for a network device reside. For example, the application programs 54 for the client network devices 12, 14, 16 may include a web-browsers or other application programs, cloud application programs 62, while application programs for the server network devices 20, 22, 24, 26 may include other application programs (e.g., 30', 62, 64, etc.).

However, the protocol stack 38 is not limited to the protocol layers illustrated and more, fewer or other layers and protocols can also be used in protocol stack 38. In addition, other protocols from the Internet Protocol suites (e.g., HTTP, SMTP, POP3, IMAP, XML, VoIP, SIP SLP, IM, etc.) and/or other protocols from other protocol suites may also be used in protocol stack 38.

HTTP is a standard protocol for communications on the World Wide Web. For more information on HTTP, see IETF RFC-2616, incorporated herein by reference.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on POP3, see IETF RFC-1939, incorporated herein by reference.

IMAP is a protocol for retrieving e-mail messages from a server. For more information on IMAP, see IETF RFC-1730, incorporated herein by reference.

EXtensible Markup Language (XML) is XML (Extensible Markup Language) is a markup language for data that allows information and services to be encoded with meaningful structure and semantics that computers and humans can understand. XML is used for information exchange, and includes user-specified and industry-specified tags. For more information on XML, see IETF RFC 3023.

VoIP is a set of facilities for managing the delivery of voice information using IP 28 packets. In general, VoIP is used to send voice information in digital form in discrete data packets (i.e., IP 28 packets) over data networks 18 rather than using traditional circuit-switched protocols used on the PSTN. VoIP is used on both wireless and wired data networks.

VoIP typically comprises several applications (e.g., SIP, SLP, H.323, H.324, DNS, AAA, etc.) that convert a voice signal into a stream of packets (e.g., IP 28 packets) on a packet network and back again. VoIP allows voice signals to travel over a stream of data packets over a cloud communications network 18.

As is known in the art, Session Initiation Protocol (SIP) supports user mobility by proxying and re-directing requests to a mobile node's current location. Mobile nodes can register their current location. SIP is not tied to any particular conference control protocol. SIP is designed to be independent of a lower-layer transport protocol and can be extended. For more information on SIP, see IETF RFC-2543, the contents of which are incorporated herein by reference.

As is known in the art, Service Location Protocol (SLP) provides a scalable framework for the discovery and selection of network services. Using SLP, network devices using the Internet need little or no static configuration of network services for network based applications. For more information on SLP see IETF RFC-2608, incorporated herein by reference.

As is known in the art, H.323 is one of main family of video conferencing recommendations for IP networks. The ITU-T H.323 standards entitled "Packet-based multimedia communications systems" dated February 1998, September 1999, November 2000 and July 2003 are incorporated herein by reference.

As is known in the art, H.324 is a video conferencing recommendation using Plain Old Telephone Service (POTS) lines. The ITU-T H.324 standards entitled "Terminal for low bit-rate multimedia communication" dated February 1998 and March 2002 are incorporated herein by reference.

As is known in the art, a Domain Name System (DNS) provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated herein by reference.

As is known in the art, Authentication Authorization and Accounting (AAA) includes a classification scheme and exchange format for accounting data records (e.g., for call billing, etc.). For more information on AAA applications, see, IETF RFC-2924, the contents of which are incorporated herein by reference.

VoIP services typically need to be able to connect to traditional circuit-switched voice networks such as those provided by the PSTN. Thus, VoIP is typically used with the H.323 protocol and other multimedia protocols. H.323 and H.324 terminals such as multimedia computers, handheld devices, PDAs or other devices such as non-mobile and mobile phones connect to existing wired and wireless cloud communications networks 18 as well as private wired and wireless networks.

H.323 and H.324 terminals implement voice transmission functions and typically include at least one voice codec (e.g., ITU-T CODECS, G.711, G.723, G.726, G.728, G.729, GSM, etc.) that sends and receives packetized voice data and typically at least one video codec (e.g., MPEG, etc.) that sends and receives packetized video data).

An Instant Message (IM) is a "short," real-time or near-real-time message that is sent between two or more end user devices such (computers, personal digital/data assistants (PDAs) mobile phones, etc.) running IM client applications. An IM is typically a short textual message. Examples of IM messages include America Online's Instant (AIM) messaging service, Microsoft Network (MSN) Messenger, Yahoo Messenger, and Lycos ICQ Instant Messenger, IM services provided by telecom providers such as T-Mobile, Verizon, Sprint, and others that provide IM services via the Internet and other wired and wireless communications networks. In one embodiment of the present invention, the IM protocols used meet the requirements of Internet Engineering Task Force (IETF) Request For Comments (RFC)-2779, entitled "Instant Messaging/Presence Protocol Requirements." However, the present invention is not limited to such an embodiment and other IM protocols not compliant with IETF RFC 2779 may also be used.

In one embodiment, the plural server network devices 20, 22, 24, 26 include a connection to plural network interface cards (NICs) in a backplane connected to a communications bus. The NIC cards provide gigabit/second ($1\times10^9$ bits/second) communications speed of electronic information. This allows "scaling out" for electronic document processing. The NICs are connected to the plural server network devices 20, 22, 24, 26 and the communications network 18. However, the present invention is not limited to the NICs described and other types of NICs in other configurations and connections with and/or without a buses can also be used to practice the invention.

In one embodiment, network devices 12, 14, 16, 20, 22, 24, 26 and wired and wireless interfaces including the NICs include "4G" components. As is known in the art "4G" refers to the fourth generation of wireless communications standards and speeds of 100 megabits/second to gigabits/second or more. It is a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G NICs include IP packet-switched NICs, wired and wireless ultra-broadband (i.e., gigabit speed) access NICs, Worldwide Interoperability for Microwave Access (Wi-MAX) NICs and multi-carrier transmission NICs. However, the present invention is not limited to this embodiment and 1G, 2G and 3G and/or any combination thereof, with or with 4G NICs can be used to practice the invention.

Security and Encryption

Network devices and/or wired and wireless interfaces of the present invention include security and encryption for secure communications on the cloud communications network 18 and/or cloud communications network 18'. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the domain name "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference.

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods and more, fewer and/or other types of security and encryption methods can be used to practice the invention.

Internet Television Services

In one embodiment, the applications 30, 62, 64 provide information services over the communications network 18 via television services. The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television (CATV) formats.

However, the present invention is not limited to such Internet Television services and more, fewer and/or other Internet Television services can be used to practice the invention.

General Search Engine Services

In one embodiment, the applications 30, 62, 64 provide information services via general search engine services. A search engine is designed to search for information on a communications network 18 such as the Internet including World Wide Web servers, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the applications 30, 62, 64 provide general search engine services as stand alone services. In another embodiment, the applications 30, 62, 64 provide general search engine services by interacting with one or more other public search engines (e.g., GOOGLE, BING, YAHOO, etc.) and/or private search engine services.

However, the present invention is not limited to such general search engine services and more, fewer and/or other general search engine services can be used to practice the invention.

Social Networking Services

In one embodiment, the applications 30, 62, 64 provide information services via one more social networking services to/from one or more social networking web-sites 13 (e.g., FACEBOOK, U-TUBE, TWITTER, MY-SPACE, MATCH.COM, E-HARMONY, etc.). The social networking web-sites include, but are not limited to, dating web-sites, blogs, RSS feeds, and other types of information web-sites in which messages can be left or posted for a variety of social activities.

However, the present invention is not limited to the social networking services described and other public and private social networking services can also be used to practice the invention.

Cloud Computing Networks

In one embodiment, the communications network 18 includes a cloud communications network 18' comprising plural different networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

Figure 4:
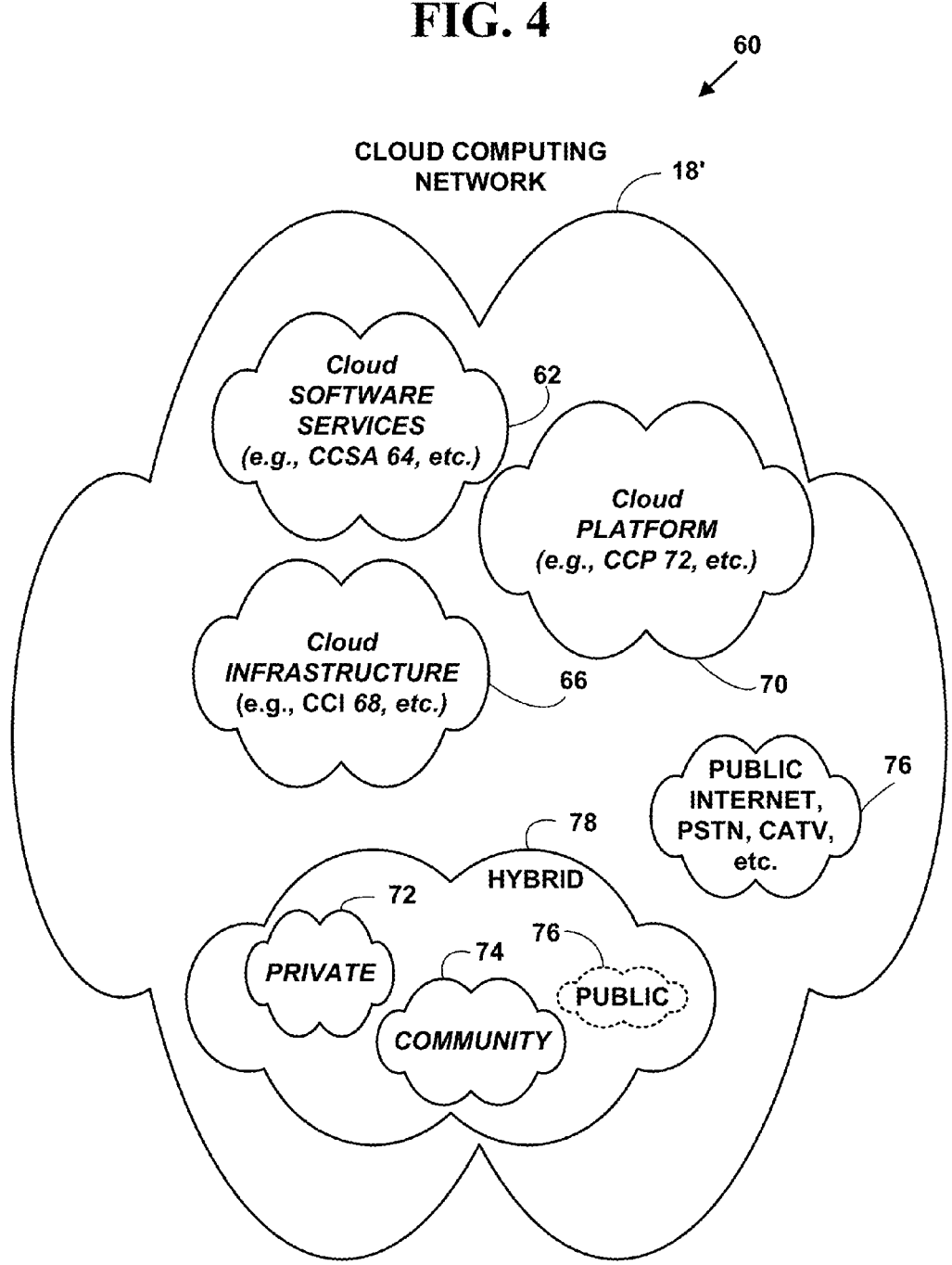
FIG. 4 is block diagram illustrating an exemplary cloud communications network.

FIG. 4 is a block diagram 60 illustrating an exemplary cloud communications network 18'. However, the present invention is not limited to this cloud computing model and other cloud computing models can also be used to practice the invention. The exemplary cloud communications network includes both wired and/or wireless components of public and private networks.

This exemplary cloud computing model for electronic information display promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

On-demand electronic document services. A document servicer can unilaterally provision computing capabilities, such as server time and network storage, as needed automatically without requiring human interaction with each network server on the cloud communications network 18'.
Broadband network access. Electronic information display capabilities are available over plural broadband communications networks and accessed through standard mechanisms that promote use by heterogeneous thin or thick client platforms (e.g., mobile phones, smart phones 14, tablet computers 12, laptops 12', PDAs, etc.). The broadband network access includes high speed network access such as 3G and/or 4G wireless and/or wired and broadband and/or ultra-broad band (e.g., WiMAX, etc.) network access.
Resource pooling. Electronic information display computing resources are pooled to serve multiple electronic document processors using a multi-tenant model, with different physical and virtual resources dynamically assigned and reassigned according to electronic document processing demand There is a sense of location independence in that the electronic document processor generally has no control or knowledge over the exact location of the provided electronic document resources but may be able to specify location at a higher level of abstraction (e.g., country, state, or datacenter). Examples of pooled resources include storage, processing, memory, network bandwidth, virtual server network device and virtual target network devices.
Rapid elasticity. Capabilities can be rapidly and elastically provisioned, in some cases automatically, to quickly scale out and rapidly released to quickly scale in for electronic information display searching To the electronic document processor, the electronic document capabilities available for provisioning appear to be unlimited and can be used in any quantity at any time
Measured Services. Cloud computing systems automatically control and optimize resource use by leveraging a metering capability at some level of abstraction appropriate to the type of electronic information display service (e.g., storage, processing, bandwidth, custom electronic information displays, etc.). Electronic information display usage is monitored, controlled, and reported providing transparency for both the electronic information display provider and the electronic document processor of the utilized electronic information display service.

Exemplary cloud computing service models illustrated in FIG. 4 appear in Table 2. However, the present invention is not limited to these service models and more, fewer or other service models can also be used to practice the invention.

TABLE 2

Cloud Computing Software Applications 62 for an Electronic information display Service (CCSA 64). The capability to use the provider's applications 30, 62, 64 running on a cloud infrastructure 66. The cloud computing applications 62, are accessible from the server network device 26 from various client devices 12, 14, 16 through a thin client interface such as a web browser, etc. The user does not manage or control the underlying cloud infrastructure 66 including network, servers, operating systems, storage, or even individual application 30, 62, 64 capabilities, with the possible exception of limited user-specific application configuration settings.
Cloud Computing Infrastructure 66 for the Electronic information display Service (CCI 68). The capability provided to the user is to provision processing, storage, networks 18, 72, 74, 76, 78 and other fundamental computing resources where the consumer is able to deploy and run arbitrary software, which can include operating systems and applications 30, 62, 64. The user does not manage or control the underlying cloud infrastructure 66 but has control over operating systems, storage, deployed applications, and possibly limited control of select networking components (e.g., host firewalls, etc.).
Cloud Computing Platform 70 for the Electronic information display Service (CCP 72). The capability provided to the user to deploy onto the cloud infrastructure 66 created or acquired applications created using programming languages and tools supported servers 20, 22, 24, 26, etc.. The user not manage or control the underlying cloud

TABLE 2-continued infrastructure 66 including network, servers, operating systems, or storage, but has control over the deployed applications 30, 62, 64 and possibly application hosting environment configurations.

Exemplary cloud computing deployment models appear in Table 3. However, the present invention is not limited to these deployment models and more, fewer or other deployment models can also be used to practice the invention.

TABLE 3

Private cloud network 72. The cloud network infrastructure is operated solely for an electronic information display organization. It may be managed by the electronic information display organization or a third party and may exist on premise or off premise.
Community cloud network 74. The cloud network infrastructure is shared by several different organizations and supports a specific electronic document community that has shared concerns (e.g., mission, security requirements, policy, compliance considerations, etc.). It may be managed by the different organizations or a third party and may exist on premise or off premise.
Public cloud network 76. The cloud network infrastructure such as the Internet, PSTN, CATV, etc. is made available to the general public or a large industry group and is owned by one or more organizations selling cloud services.
Hybrid cloud network 78. The cloud network infrastructure 66 is a composition of two and/or more cloud networks 18' (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 64 for electronic information displays takes full advantage of the cloud paradigm by being service oriented with a focus on statelessness, low coupling, modularity, and semantic interoperability for electronic document processing.

Electronic information on the communications network 18 and the cloud communications network 18' are stored in data storage objects including cloud storage objects. Cloud storage objects present a single unified namespace or objectspace and manages desired electronic content by user or administrator-defined policies storage and retrieval policies. Cloud storage objects and data storage objects include REpresentational State Transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects and/or data storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18.

LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction.

Automated Work Project Management

FIGS. 5A-5D are a flow diagram for a Method 80 for automated work project management.

Figure 5B:
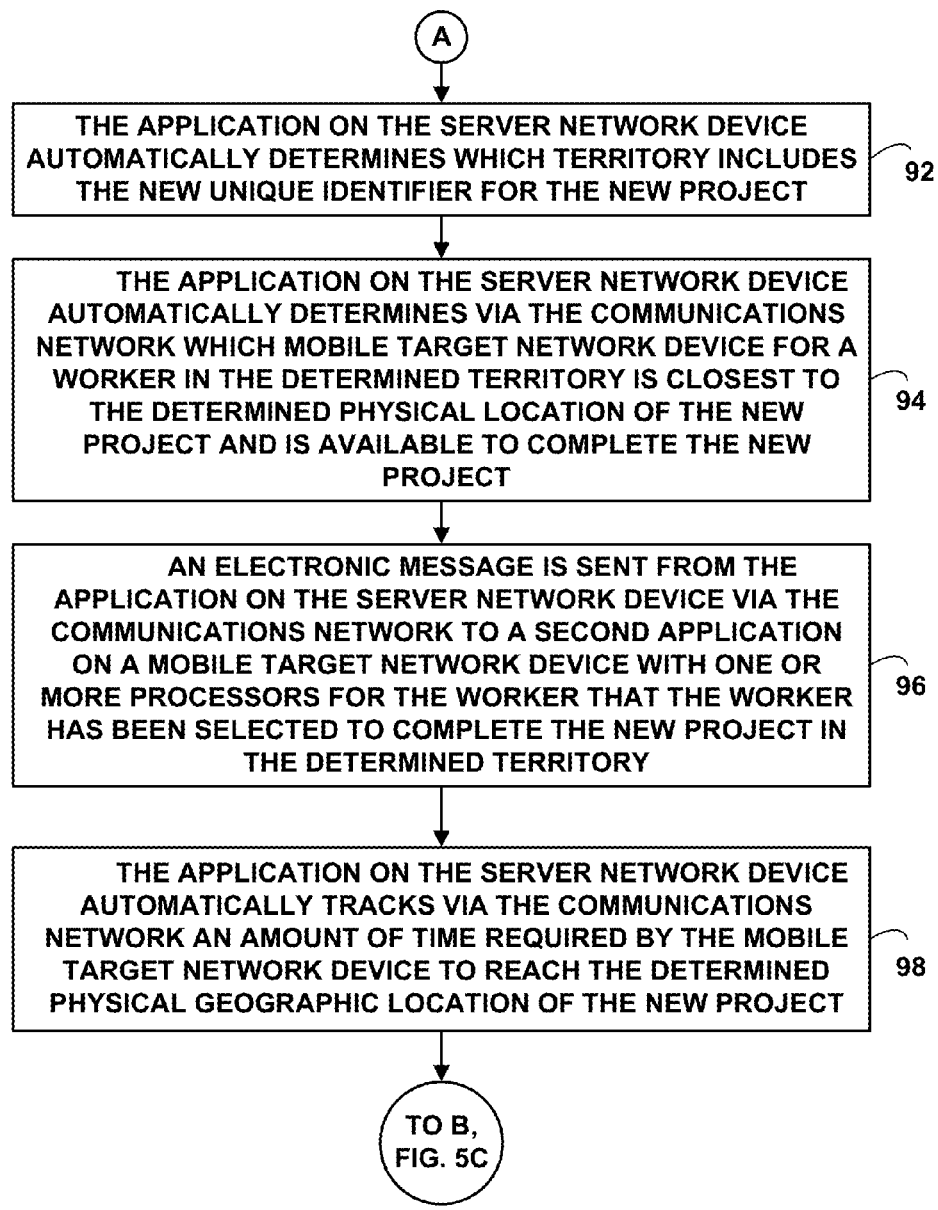
Figure 5C:
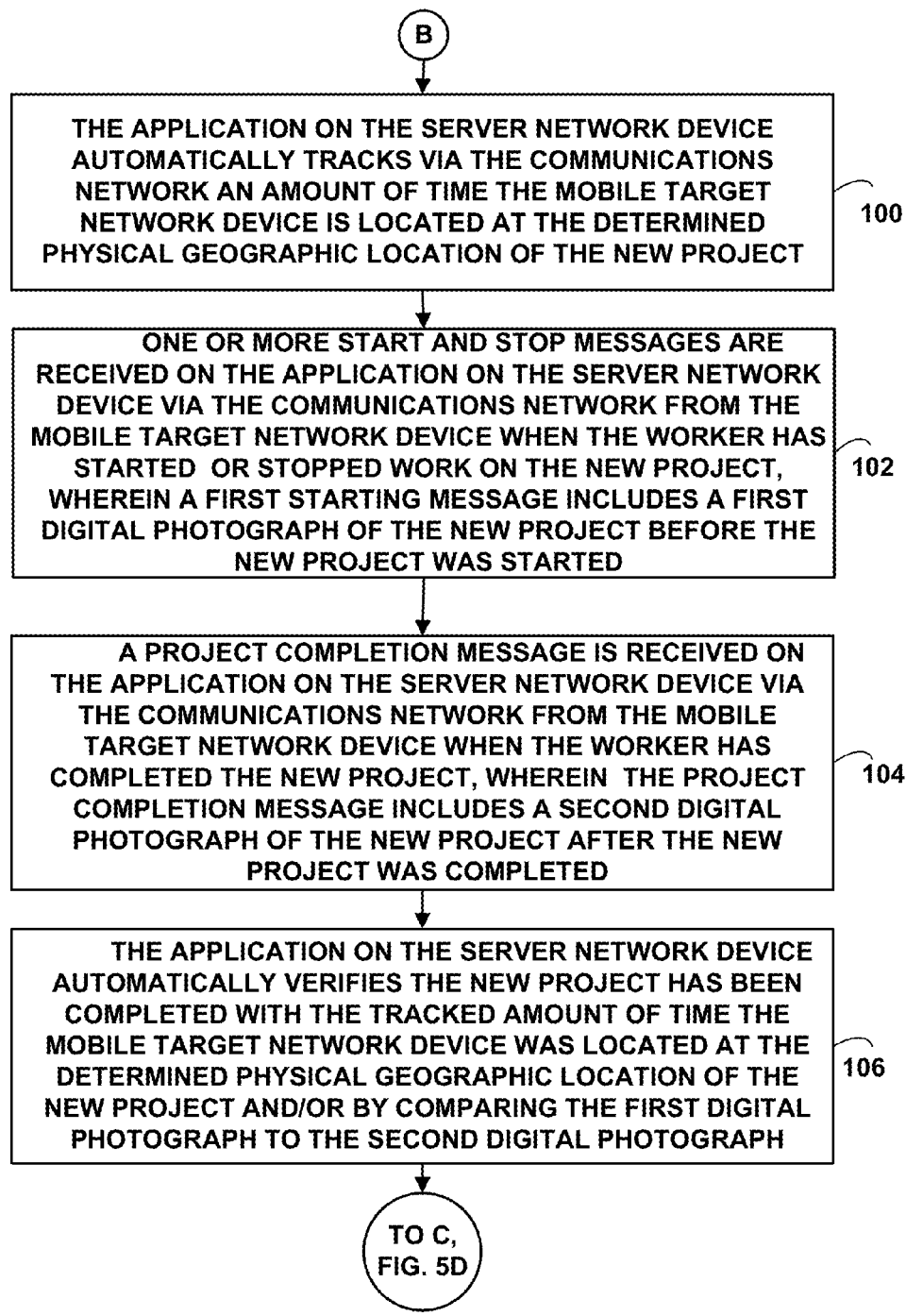
Figure 5D:
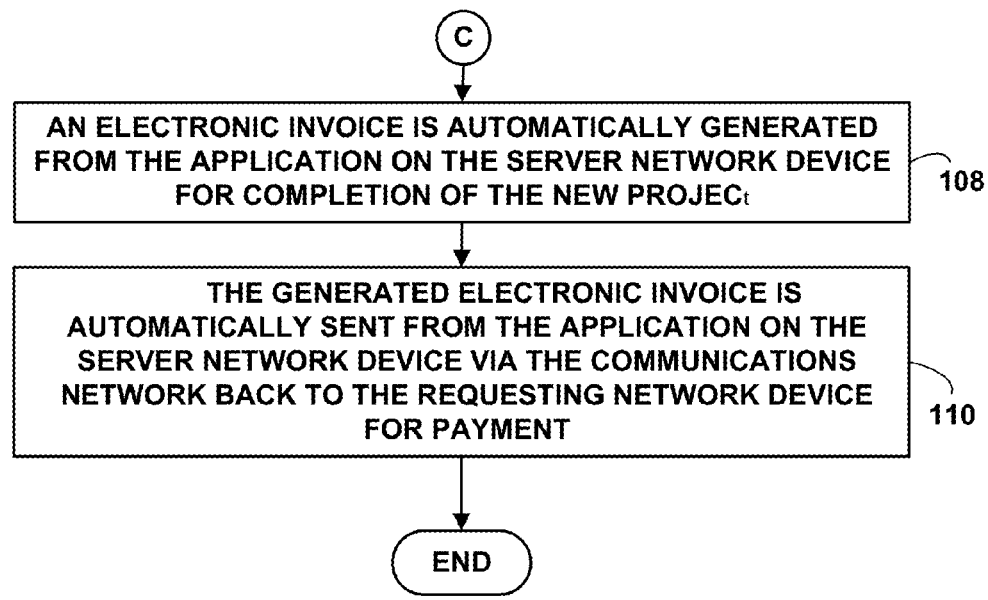

In FIG. 5A at Step 82, a new electronic work order is received on an application on a server network device with one or more processors via a communications network from a requesting network device with one or more processors. The electronic work order includes a new project to be completed at a street address. At Step 84, the application on the server network device stores the new electronic work order in a database associated with the server network device. At Step 86, the application on the server network device automatically determines a physical geographic location of the new project with the street address from the new electronic work order. At Step 88, the application on the server network device automatically identifies the determined physical geographic location of the new project with a new unique graphical identifier. At Step 90, the application on the server network device automatically adds the new unique graphical identifier to an electronic map including plural current geographic physical locations of plural mobile target network devices for plural workers who are able to complete the new project. The electronic map includes a plural different territories. In FIG. 5B at Step 92, the application on the server network device automatically determines which territory includes the new unique identifier for the new project. At Step 94, the application on the server network device automatically determines via the communications network which mobile target network device for a worker in the determined territory is closest to the determined physical location of the new project and is available to complete the new project. At Step 96, an electronic work product message is sent from the application on the server network device via the communications network to a second application on a mobile target network device with one or more processors for the worker that the worker has been selected to complete the new project in the determined territory. At Step 98, the application on the server network device automatically tracks via the communications network an amount of time required by the mobile target network device to reach the determined physical geographic location of the new project. In FIG. 5C, at Step 100, the application on the server network device automatically tracks via the communications network an amount of time the mobile target network device is located at the determined physical geographic location of the new project. At Step 102, one or more start and stop messages are received on the application on the server network device via the communications network from the mobile target network device when the worker has started the new project. A first starting message may include a first digital photograph of the new project before the new project was started. At Step 104, a project completion message is received on the application on the server network device via the communications network from the mobile target network device when the worker has completed the new project. The project completion message includes a second digital photograph of the new project after the new project was completed. At Step 106, the application on the server network device automatically verifies the new project has been completed with the tracked amount of time the mobile target network device was located at the determined physical geographic location of the new project and/or by comparing the first digital photograph to the second digital photograph. In FIG. 5D at Step 108, an electronic invoice is automatically generated from the application on the server network device for completion of the new project. At Step 110, the generated electronic invoice is automatically sent from the application on the server network device via the communications network back to the requesting network device for payment. It is also possible for a business to establish a new location that will have recurring work orders created at the location and will follow the same format on each recurrence of the same work order.

Figure 6:
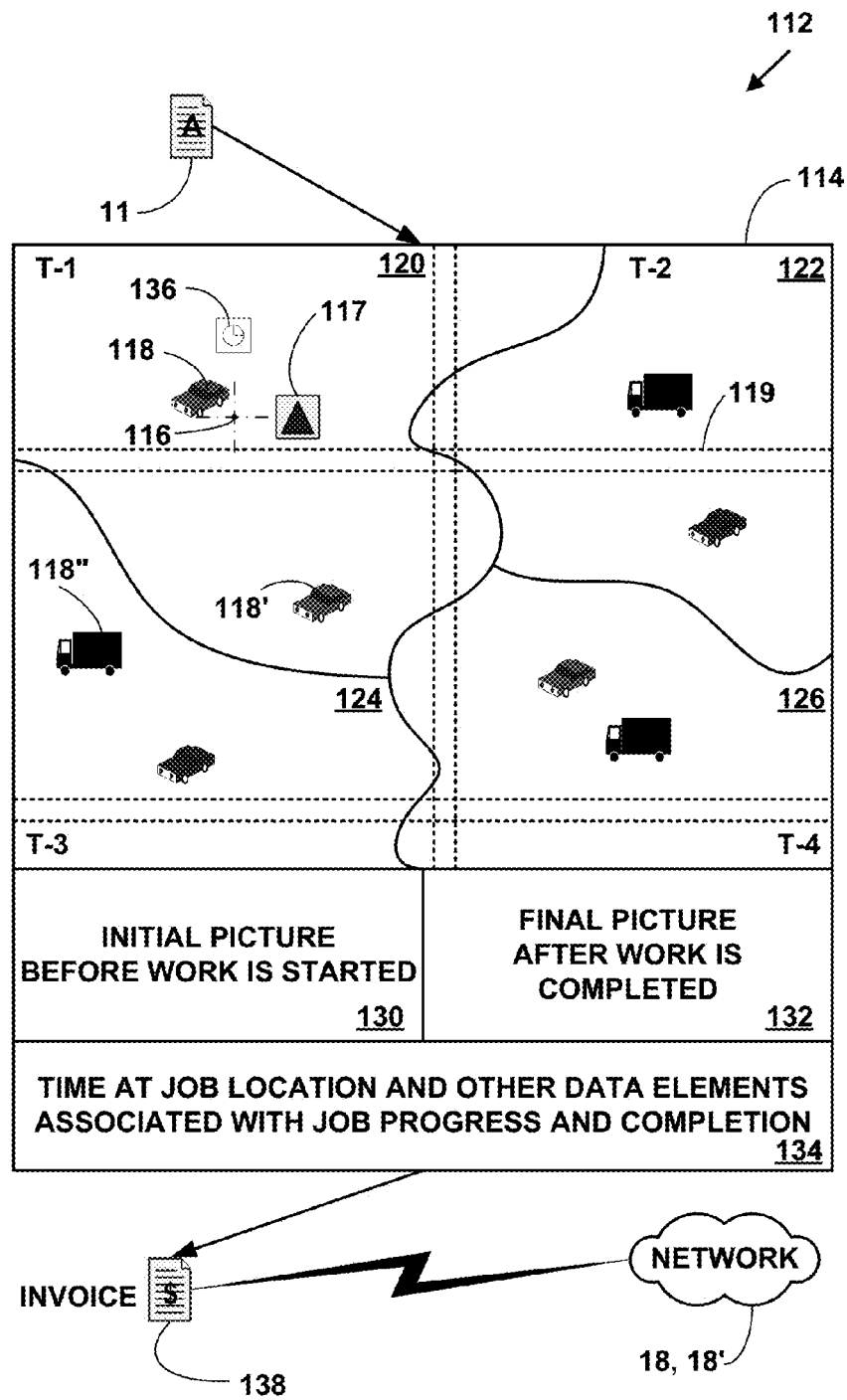
FIG. 6 is a block diagram of a graphical user interface displaying an electronic map illustrating additional details of the method of FIG. 5.

FIG. 6 is a block diagram 112 of a graphical user interface 32 displaying and electronic 114 illustrating additional details of Method 80 of FIG. 5.

Method 80 is illustrated with one exemplary embodiment. However, the present invention is not limited to this embodiment and other embodiments can also be used to practice the invention.

In such an exemplary embodiment at FIG. 5A at Step 82, a new electronic work order 11 (FIG. 1) is received on an application 30', 62', 64' on a server network device (e.g., 20, etc.) with one or more processors via a communications network 18 from a requesting network device (e.g., 12, 14, 16, 22, 24, etc.) with one or more processors. The electronic work order 11 includes a new project to be completed at a street address on a street 119 (streets are illustrated with dotted lines in FIG. 6 for simplicity).

The new electronic work orders 11, include, but are not limited to, new work orders for installing a telephone line, CATV cable, to mark an area for safe digging, a new construction project, a maintenance project, a janitorial and/or cleaning project, a lawn care project, etc. However, the present invention is not limited to the new electronic work orders described and more, fewer or other types of electronic work orders can be used to practice the invention.

In one embodiment, the application 30', 62', 64' includes a cloud application received from a cloud network 18'. In such an embodiment, the application 30', 62', 64' on the server network device 20 and the second application 30, 62, 64 on the mobile target network devices 12, 14, 16 provide a cloud computing Infrastructure as a Service (IaaS) 68, a cloud computing Platform, as a Service (PaaS) 72 and offers Specific cloud electronic document services as a Service (SaaS) 64 including a cloud software service, wherein the IaaS, PaaS and SaaS include one or more of automatic electronic document services comprising networking, storage, server network device, virtualization, operating system, middleware, run-time, data or application services, or plural combinations thereof, on the cloud communications network.

However, the present invention can be practice with or without a cloud application and/or a cloud communications network and the present invention is not limited to cloud communications networks.

At step 84, the application 30', 62', 64' on the server network device 20 stores the new electronic work order 11 in a database 20' associated with the server network device 20. In one embodiment, all storage in database 20' is completed with Lightweight Directory Access Protocol (LDAP). However, the present invention is not limited to LDAP and other protocols can be used to store and access data in database 20' (e.g., structured query language (SQL) and others, etc.)

In one embodiment, the database 20' schema of the system 10 contains multiple tables: Project or Tickets, Territory Assignment, Personnel Setup, Details, Incident Reporting, Quality Assurance, Time Keeper, Time off Requests, Error Logs, Field Surveys, Billing records, Billing Units, Documents, Allowable Billing Items, Mateial Items, Materials Received, Materials Needed, Materials Used. Each table has several field and relationships included to link all of the records in each table together. The Territory assignment table helps the management set up territories 120-126 for workers 119 by municipality or by polygon images plotted onto a map. Territories can be configured to identify the management user responsible for the territory and workers 118 responsible for completing the work assignment in that territory. When a new work order 11 is received into application 30', 62', 64' it automatically assigns the new work order 11 based on the territory assigned to the appropriate worker and also has capability to automatically assign based on a physical geographic location to an appropriate worker 118. However, the present invention is not limited to this embodiment, and more, fewer and other database 20' table can be used to practice the invention.

At Step 86, the application 30', 62', 64' on the server network device 20 automatically determines a physical geographic location 116 (FIG. 6) of the new project with the street address for a street 119 (FIG. 6) from the new electronic work order 11.

In one embodiment, the determined physical geographic location 116 includes Global Positioning Satellite (GPS), data, Geo-coding data, electronic map data, three-dimensional (3D) (X, Y, Z) geo-coordinates, mobile phone cell tower location information and/or other physical geographic location information.

The "Global Positioning System (GPS)" is a space-based global navigation satellite system (GNSS) that provides reliable location and time information in all weather and at all times and anywhere on or near the Earth. A GPS receiver calculates its position by precisely timing signals sent by GPS satellites. A GPS receiver uses the messages it receives to determine a transit time of each message and computes a distance to each GPS satellite. These distances along with the satellites' locations are used with the possible aid of triangulation, depending on which algorithm is used, to compute a current physical position of the GPS receiver. This position is then displayed, perhaps with a moving map display (e.g., at a street level, etc. and/or latitude and longitude and/or elevation information may also be included. Many GPS units also show derived information such as travel direction and speed, calculated from position changes. The GPS coordinates include standard GPS, GPS map, Digital GPS (DGPS) and/or other types of GPS information.

"Geo-coding" is the process of finding associated geographic coordinates (often expressed as latitude and longitude) from other geographic data, such as street addresses, or ZIP codes (postal codes). With geographic coordinates the features can be mapped and entered into Geographic Information Systems, or the coordinates can be embedded into media such as digital photographs via geo-tagging. Reverse geo-coding is the opposite: finding an associated textual location such as a street address, from geographic coordinates. There are many web-sites on the Internet that provide geo-coded data (e.g. geocoder.us, etc.)

"Electronic map data" includes electronic map data from such sites as GOOGLE, YAHOO, MAPQUEST and other electronic map sites. The electronic map data includes real-time information. Real-time information includes information updated at a same rate as data is received enabling the data to be used direct or control a process.

A mobile network device such as a smart phone, tablet computer, etc. sends out a signal that may be picked up by three or more cell towers, enabling the "triangulation" location information to be used to locate the device. A distance to an item from each of three distinct points provides an approximate location of that item in relation to the three reference points. This geometric calculation applies in the case of mobile network devices such as cell phones, since the locations of the cell towers which receive the phone's signal are fixed and well known and an estimate a distance of the mobile phone from each of those antennae towers can be determined based upon the lag time between when the tower sends a ping to the phone and receives the answering ping back.

"Three-dimensional (3D) (X, Y, Z) geo-coordinate" data includes electronic map data in three-dimensional space (e.g., building, office, desk, etc.) including a determined physical geographic location.

However, the present invention is not limited to determined physical geographic location described and more, fewer and other techniques and/or data may be used to provide the determined physical geographic location.

At Step 88, the application 30', 62', 64' on the server network device 20 automatically identifies the determined physical geographic location 116 of the new project with a new unique graphical identifier 117 (FIG. 6).

In one embodiment, the unique graphical identifier 117 is a unique graphical icon such as a car, truck, person, shape 117 (e.g. circle, triangle, square, etc.) number, etc. The unique graphical icons include plural different colors for easy viewing, determining which worker is assigned to the project, and also indicate status of the new project. For example, a red color indicates a new project has been received in a territory, a yellow color indicates work has been started on the new project and a green color indicates work has been completed on the new project. However, the present invention is not limited to the graphical icons or colors described and more, fewer and other graphical icons and/or text and/or multimedia identifiers and/or colors may be used to practice the invention.

At Step 90, the application 30', 62', 64' on the server network device 20 automatically adds the new unique graphical identifier 117 to a GUI 32 of electronic map 114 including plural current geographic physical locations of plural mobile target network devices 12, 14, 16 for plural workers 118, 118', 118" who are able to complete the new project. The electronic map 114 includes a plural different territories 120, 122, 124, 126 (labeled T-1 through T-4 in FIG. 6).

The electronic map 114 has zoom-in and zoom-out capabilities. The electronic map can be view in two-dimensions and/or in three-dimensions. The electronic map 114 uses plural colors and display a large number of different objects When the 3D graphical objects are displayed on the GUI 34, they provide a more distinct graphical object that is more easily viewable and one that "pops" off the GUI 32 when viewed by a trader. The 3D objects allow a viewer to more easily follow the object visually as the in window. In one embodiment, 3D glasses are not required or used to view the 3D graphical objects. In such an embodiment, the 3D graphical objects are displayed in a specialized 3D format using a first type of 3D API.

In another embodiment, 3D glasses are used to view the 3D graphical objects. In such an embodiment, the 3D graphical objects are displayed in a specialized 3D format using another type of 3D API. However, 3D glasses are not required to view the 3D graphical objects and the invention can be practiced without 3D glasses, the specialized 3D format or the 3D API.

For example in one embodiment with 3D glasses required, 3D stereoscopy is used. 3D stereoscopy (also called stereoscopic or 3-D imaging) is a technique capable of recording three-dimensional visual information and/or creating the illusion of depth in an image for 3D display. However, the present invention is not limited to such embodiments an 3D objects can be used without specialized 3D glasses, etc.

In FIG. 5B at Step 92, the application 30', 62', 64' on the server network device 20 automatically determines which territory (e.g., T-1, 120, etc.) includes the new unique identifier 117 for the new project.

At Step 94, the application 30', 62', 64' on the server network device 20 automatically determines via the communications network 18 which mobile target network device 12, 14, 16 for a worker 118, 118' in the determined territory 120 is closest to the determined physical location 116 of the new project and is available to complete the new project.

At Step 96, an electronic work project message is sent from the application 30', 62', 64' on the server network device 20 via the communications network 18 to a second application 30, 62, 64 on a mobile target network device (e.g., 12, etc.) with one or more processors for the worker 118, indicating the worker 118 has been selected to complete the new project in the determined territory 120.

In one embodiment, the electronic work project messages is a text message, instant message, e-mail, live voice message, VoIP message, recorded audio message, recorded video message, etc. However, the present invention is not limited to this embodiment and more fewer of other types of electronic messages can be used to practice the invention.

In one embodiment, the application 30', 62', 64' performs a query of how far a worker 118 is from a physical geographic location of a new project using a GPS location of the new project and GPS location of the user and determining if the new project should be sent to that worker 118 or sent to another worker 118'. Once sent to the worker 118 the application 30', 62', 64' on the server network device will send a text message and/or other type of message to indicate that the new project was issued to a specific worker 118. If the worker 118 does acknowledge the message, the application 30', 62', 64' will initiate a phone call to the worker 118 requiring response using an interactive Voice Response (IVR) system to inform the worker 118 of the new project. The IVR may also be used to contact and interact with a customer and/or client requesting the new project. In the event that the worker 118 does not answer the phone call, the application 30', 62', 64' will call other workers or managers 118' until it receives a response. The application 30', 62', 64' also logs which workers responded to the call and/or text messages and such responses and/or non-responses are used to make future assignments of new projects.

At Step 98, the application 30', 62', 64' on the server network device 20 automatically tracks via the communications network an amount of time required by the mobile target network device 12 to reach 128 the determined physical geographic location of the new project. Collection of such data is one type of analytic automatically collected by the system 10.

In one embodiment, the application 30' 62', 64' allows optimizes the new project assigned to the worker 118 by identifying a worker's 118 current physical geographic location and automatically calculating a shortest time for the worker 118 to drive to all of the new projects assigned to the worker 118. This is displayed on the electronic map 114 visually and then also displayed in a worker's 118 list of projects so it can be presented to the worker 118 and sorted in a priority order the worker should complete their projects. The system 10 also includes the capability to effectively route from a start depot each day and will sequence the geographical locations of all of the projects to start and stop at the same location each day.

"Analytics" is the discovery and communication of meaningful patterns in data. Especially valuable in areas rich with recorded information, analytics relies on the simultaneous application of statistics, computer programming and operations research to quantify performance Analytics often favors data visualization to communicate insight.

One purpose of collection travel analytics is to improve response time to a request to complete a work order. For example, if a worker 118 was assigned a new work order 11 and traveled on a highway that was prone to traffic backups, a preferred travel route may be included in the work order. Instead of traveling on the highway, the work order may suggest the worker 118 take a less busy county road to avoid traffic congestion on the highway and improve response time.

The travel time analytics are stored in database 20'. In addition, real-time analytics are also used to practice the invention. For example, before assigning a new work order to a worker 11, the system 10 would automatically consider real-time traffic information to suggest a preferred travel route. If the preferred travel route was county highway A, but there is currently and accident on county highway A, the worker may be automatically directed in real-time to county highway C to avoid the accident.

Management workers control what project records are visible to the worker 119 responsible for a territory 120-126 to manage due dates and prevent the worker 119 from having work assignments past the due date field.

In one embodiment, the application 30', 62', 64' on the server network device 20 includes a process that will display new project records from the database 20' in a calendar format which is has filters on it to allow a user to see records in a certain region or territory, a specific work or group of works records, and/or all records that meet a certain status criteria. The project record includes a scheduled date and stop dates to show if a project must have starts and stops. The calendar displays the records or projects based on these dates in a monthly calendar format. The records are then allowed to be dragged to other dates which will automatically update the record. For instance if a record has a scheduled date of January 15$^{th}$ it will display on the calendar under this date the user can drag the record to January 20$^{th}$ and the record will automatically change. There is also a batch update function that allows users to change the status or assignment of multiple database 20' records at one time.

In FIG. 5C at Step 100, the application 30', 62', 64' on the server network device 20 automatically tracks via the communications network 18 an amount of time 136 the mobile target network device 12 and the worker 118 is located at the determined physical geographic location 116 of the new project. The work times are stored in database 20' and are used to calculate the final invoice. The application 30', 62', 64' also provides for the user to set a status to a work order and indicate other information relating to the work performed and the application will calculate which billing item shall be used in accordance with the project. For use in larger projects the customer may opt to require their subcontractors to utilize said application. In these instances the customer or client shall also be able to control which billing items are permitted to be billed against a particular project.

At Step 102, one or more start and stop messages are received on the application 30' 62' 64' on the server network device 20 via the communications network 18 from the mobile target network device 12 when the worker 118 has started the new project. A first starting message may include a first digital photograph 130 of the new project before the new project was started. In one embodiment, the mobile target network device 12 includes a camera component. In another embodiment, a separate camera is used to collect the digital photograph and/or video.

In one embodiment, the first digital photograph 130 may be replaced by a real-time video and/or recorded video sent from the target mobile network device 12 back to the server network device 20.

Such digital photographs 130, 132 and/or video is stored in database 20' as another type of analytic. For example, if the new work order 11 was a work order to determine where underground objects such as power lines, gas pipes, water pipes, etc. are located before a person was going to dig at the location, such underground objects are recorded on the digital photographs and/or in the video. If a new work order 11 was received for the same street address and no new cables, wires, pipelines, etc. were added recently, a corresponding digital photograph or video could be returned to a worker on-site to complete the new work order in a quick and efficient manner. In the current embodiment, different types of objects are displayed with different colors on GUI 34 to allow quick and easy identification of such objects.

As another example, if the new work order 11 was for a new telephone line and/or a new CATV cable and such lines and/or cables were already installed, the digital photographs and/or video in the database 20' are used to quickly and efficiently confirm the new line or cable is already installed and the new work order 11 is automatically adjusted to send out a different type of worker. That is, instead of sending out a wiring crew with large spools of wires or cables to install a new line or cable, a worker who can hook up the desired service is sent out instead. Thus, the database 20' is used to quickly and efficiently confirm new work orders 11 in multi-story and multi-family apartment buildings, condo developments, etc. saving significant time and money.

As another example, if the new work order was within a sensitive work area or the customer presented unique challenges to the business this can be updated graphically on the map and any future work orders within a user specified distance would automatically identified by the application 30', 62', 64' that the new order has special characteristics.

In one embodiment, when a worker arrives at a job site, the worker will note appropriate physical objects in the digital photographs 130, 132 and/or video. For example, if the system 10 is used to install new telephone lines or CATV cables, the worker will the location of any manholes, poles, utility closets, building entrances, cross boxes, junction boxes, etc. Such analytic data is stored in database 20'. This data allows any new additional work orders to be handled more quickly and more efficiently as a worker sent out to complete the new additional work order would not have to take time to locate a manhole, utility closet, etc. as that data was previously recorded and is sent to the worker in realtime with the new additional work order 11.

Similar data is also collected for janitorial projects (e.g., location of dumpsters, recycle, service doors, service elevators, etc.) lawn maintenance projects (e.g., which properties have dogs, which gate to use for a fenced yard, etc.), etc.

In such embodiment, the object data analytics are automatically added to the electronic map 114 as they are collected. All or a portion of the electronic map 114 with the object data analytics added is viewable by the worker 118. In another embodiment, a link to all or a portion of the electronic map 114 is sent to the worker 118 in the first starting message.

In one embodiment, the first starting message also includes a biometric for the worker 118 starting the new project. In another embodiment the starting message includes a unique identifier for the worker 118. The biometric or unique identifier for the worker 118 helps ensure the worker 118 is the actual worker completing the project.

A "biometric" is method for uniquely recognizing humans or non-human entities based upon one or more intrinsic physical or behavioral traits. Biometric identification systems include iris scans, retinal scans, fingerprints, handwriting recognition, face recognition, voice recognition, DNA, etc. Moreover, non-biological objects may also be identified using the biometric technology and we use the term "biometric" in this aspect even though these may not be biological.

In one embodiment, the mobile target network device 12 includes a biometric scanner. In such an embodiment, the worker scans his/her biometric at a start and end of work on the new project. Biometric scanners are easily attached/removed from smart phones, tablet computers, etc. In another embodiment, the mobile target network device 12 includes a previously scanned and stored biometric uniquely identifying the worker.

The unique identifiers, include, but are not limited to, employee identifiers for the workers 118, MAC addresses of the mobile target network devices 12, 14, 16, an text message identifier, an e-mail address, a social networking identifier, a unique Radio Frequency Identifier (RFID), etc. However, the present invention is not limited to this identifiers and more, fewer and other types of unique identifiers can be used to practice the invention.

If the new work order cannot be completed in one day, a stop message is sent from the mobile target network device 12 back to the server network device 20 to indicate the worker 118 has stopped work for the day. The next day another start message and possibly and stop messages is sent by the mobile target network device 12 to indicate the server network device 20 should again record the workers 118 time.

Using application 30', 62', 64' on the server network device 20, management workers have the ability to run a report that identifies how long a drive time is associated with each worker 118, 118', 118", etc. completing new work projects in the field and their time to complete the assigned new work project. This also aggregates and shows a total anticipated hours for each day's assignments. There are features that will analyze this data as work is completed and send s notification to the management worker indicating that the worker 118 completing the new work project has too much work or too little work in place for them. The application 30', 62', 64' also can be programming to include any process step that a company follows to complete each new work project so workers 118 are required to provide confirmation they have followed the process steps specified on each new work project that they complete. The management workers of the company have the ability to run reporting or can receive alerts from the application 30', 62', 64' on the server network device 20 if the process step are not followed or are altered by a worker 118. However, the present invention is not limited to this embodiment and other embodiments can be used to practice the invention.

At Step 104, a project completion message is received on the application 30' 62', 64' on the server network device 20 via the communications network 18 from the mobile target network device 12 when the worker 118 has completed the new project. The project completion message includes a second digital photograph 132 of the new project after the new project was completed. The second digital photograph 132 may be replaced by a second video, etc.

In one embodiment, the application 30', 62, 64' on the server network device 20 stores the location of the worker 118 in the field when the new work project is completed. The distance the location of the new work project to the actual location of the worker 118 when the worker 118 completed the new work project is calculated and stored. Management workers receive alerts and notifications if the user was not within a certain physical distance of the project when it was completed. This helps management workers detect fraudulent activities by the workers 118.

In one embodiment, to further prevent fraud by a work 118, there is an embedded image or Uniform Resource Locator (URL) included in every new project that is completed that is not visible to the worker 118. Each time this image is viewed (i.e., whenever a record is opened) and called from the application 30', 62', 64' on the server network device, it launches a process to identify the location of the worker's GPS device and determines if the work is at the projection location or not. If the workers 118 are located at the project location, the application 30', 62', 64' will record a start time of the new work project. There is a field included on a database entry for each new work project to identify an amount of time it is projected take to complete a new work that can be entered by a management work or a default value can be entered and stored in this field for all workers. However, the present invention is not limited to this embodiment and other embodiments can be used to practice the invention.

The application will monitor the worker's 118 time spent on the new project and if the worker 118 exceeds the duration of time entered into the new project record the icon utilized to identify the worker 188 on the electronic map 114 will change to indicate that the worker has been on the new project longer than anticipated. The application 30', 62' 64' also has the capability to send a text message to the worker 118 if the worker 118 has exceeded the allotted time on the new project and to document the reason for the delay. When the worker 118 responds to the text message the application 30', 62', 64' will store their response in a field as part of the new project record field. The business may determine the cause for such delay or application may also include delay charges as necessary on the final invoice that was calculated. However, the present invention is not limited to this embodiment and other embodiments can be used to practice the invention.

Using the embedded image or URL to invoke the GPS query described above if the application 30', 62', 64' determines that the worker's 118 GPS device is physically located near the coordinates for the new work project, the application 30', 62', 64' will write the start time of the new work project to a field located in the new project database record. The application 30', 62', 64' also identifies the completion time of a new project and a time that worker 118 has changed the status of the new project and closed out the new project record in the database. The application 30', 62', 64' performs an analytical analysis on each completed new work project to determine an actual time a worker 118 spent completing the work associated with the new project. Such analytic data is used to create time sheets for the worker 118 and is also used to adjust time requirements for similar projects or for a selected worker 118. However, the present invention is not limited to this embodiment and other embodiments can be used to practice the invention.

At Step 106, the application 30', 62', 64' on the server network device 20 automatically verifies the new project has been completed with the tracked amount of time 136 and/or one or more other factors the mobile target network device 12 and the worker 118 was located at the determined physical geographic location 116 of the new project and/or by comparing the first digital photograph 130 to the second digital photograph 132. The one or more other factors include, but are not limited to, an amount of materials used (e.g., telephone wire, CATV cables, building materials, fuel, fertilizer, etc.) an amount of network connect and/or network test time used, an amount of time a street is blocked, a manhole cover is off, etc.

Step 106 uses telemetry and/or telemetrics. "Telemetry" or "telemetrics" is a technology that allows data measurements (e.g., GPS, elapsed time, etc.) to be made from a distance. Although the term commonly refers to wireless data transfer mechanisms (e.g. using radio, hypersonic or infrared systems), it also encompasses data transferred over other wired media such as a telephone or computer network, optical link or other wired communications networks (e.g., PSTN, CATV, Internet, etc.).

The second digital photograph 132 is stored in the database 20' and examined. Any new objects (e.g., new telephone lines, CATV cables, new structures, new objects, etc.) are automatically added to the electronic map 114. This save time and money when new work orders 11 are generated for the same street address or close-by location as a worker is always provided with an up-to-date electronic map 114 of objects relevant for the new work order 11. Such analytics result in cost savings of tens to hundreds of millions of dollars annually as proper workers can be efficiently dispatched on optimal routes without wasting time, fuel, resources, etc.

In another embodiment, the second application 30, 62, 64 on the mobile target network device 12 allows objects to be located and displayed on the electronic map 114 in real-time.

Figure 7:
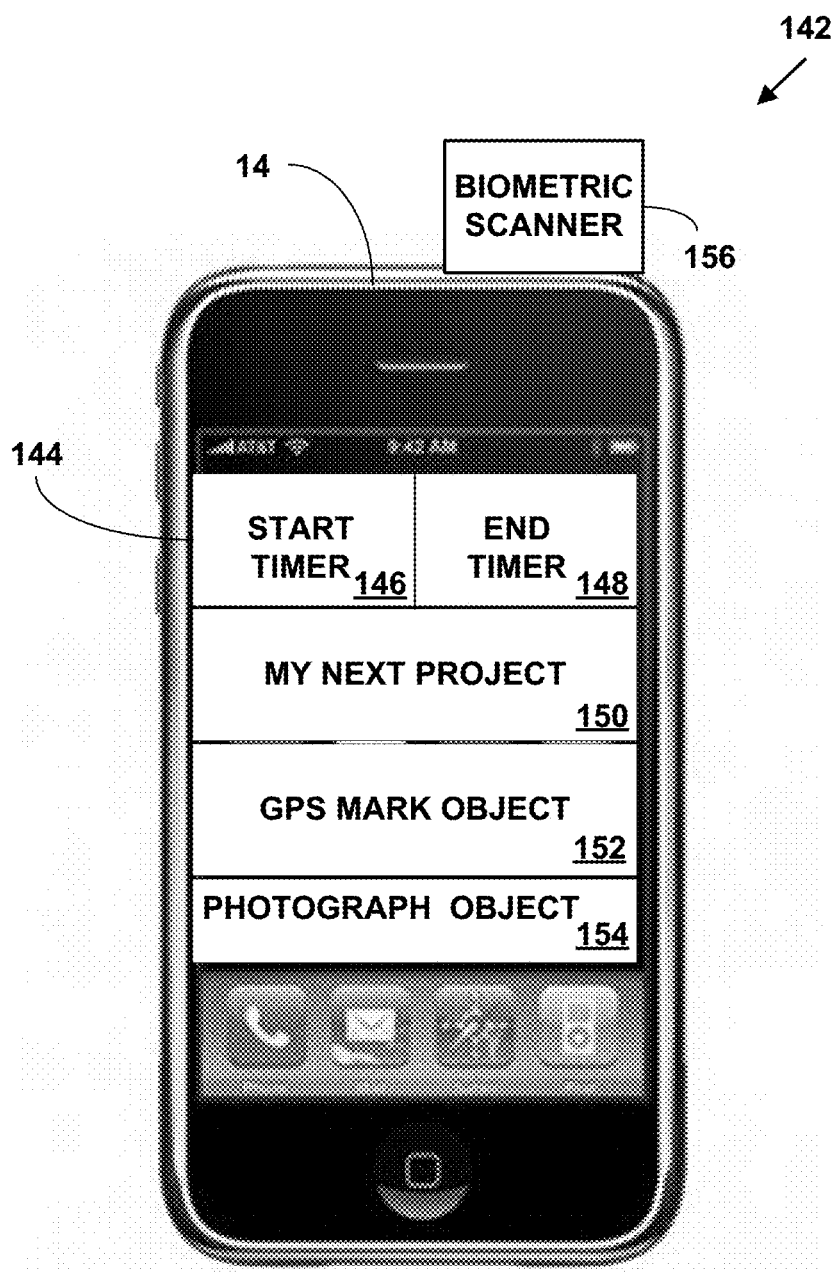
FIG. 7 is a block diagram illustrating a graphical user interface for smart phone.

FIG. 7 is a block diagram 142 illustrating a graphical user interface 144 for smart phone 14. The GUI 142 is generated and displayed by the second application 30, 62, 64 on the mobile target network device (e.g., smart phone 14, etc.) The GUI 144 includes a Start Time graphical button 146, a Stop Time graphical button 148, a My Next Project graphical button 150, a GPS mark object graphical button 152 a biometric Photograph object graphical button 154 and an optional Biometric scanner 156. However, the present invention is not limited to a smart phone 14, the graphical buttons or scanners described and more, fewer or other types of buttons and scanners can used to practice the invention. In addition, the GUI 144 can be used on mobile target network devices other than smart phones 14.

In one embodiment, the My Next Project graphical button 150 allows a work 118 to request a new project and also is a display area on the GUI 144 to allow a worker to receive information in real-time about a new project.

In one embodiment, the GUI 144 allows the worker 118 the capability to press a graphical button when viewing their projects on the mobile target network device 12 to then have the coordinates of next new work project to be automatically sent to the worker's 118 navigation device (e.g., portable stand alone GPS unit with Wi-Fi or cellular phone based GPS service (i.e. VZ Navigator), etc.) without the working 118 having to type in the location coordinates. This feature prevents the worker 118 from typing in the GPS locations for each new work project and allows it to automatically appear in any GPS device integral to, or associated with (i.e., separate from) the mobile target network device 12. However, the present invention is not limited to this embodiment and other embodiments may be used to practice the invention.

In one embodiment, the second application 30, 62, 64 as smart phone application for smart phones 14 and tablet computers 12, etc. allows the worker to take a survey picture/video and/or determine a GPS location which stores a latitude/longitude of the mobile target network device 12 and worker 118 entered characteristics of the physical geographic location. There are tags included where the worker 118 can identify the picture and/or video is a start point, end point or midpoint of the new work project. These survey picture/videos are then uploaded to the application 30', 62', 64' on the server network device 20 and a process is initiated that connect the data based on the user entered tags. However, the present invention is not limited to this embodiment and other embodiments may be used to practice the invention.

As an example, a series of utility poles can be surveyed with the second application 30, 62, 64 on the mobile target network device and then automatically plotted onto the electronic map 114 with geospatial information tagged to the graphical icons displayed on the electronic map 114. Another example is that a contractor can place a new manufacturing line for a customer and then walk over and store survey points in a factory including the manufacturing line which will automatically update the electronic map 114 for the customer's facilities. However, the present invention is not limited to this embodiment and other embodiments may be used to practice the invention.

As another example, example, using GUI 144 on smart phone 14, a worker who was installing a new telephone wire could mark the location of a telephone pole and a service closet to connect the new telephone wire into. The GPS coordinates or other types of map coordinates of the objects are recorded in real-time by the worker 118 and the recorded objects automatically appear on the electronic map 114 in real-time as the worker 118 marks them. The recorded objects are also stored for future use. Such real-time marking of relevant objects saves time, money resources and increases the speed, efficiency and decreases the cost of complete current and future new work orders 11.

When completing work assignments workers 118 update custom database fields to provide a status (as defined by management users: e.g., open, routed, completed, pending, etc) and enter notes and amounts of work that are completed on the new project.

Workers that are completing a new work project have the ability to take any other types of necessary photos and/or video and/or upload documents associated with the work that will be maintained with the new work project database entries.

Returning to FIG. 5D, at Step 108, an electronic invoice 138 is automatically generated from the application 30', 62', 64' on the server network 20 device for completion of the new project. The electronic invoice 138 is checked for errors and reconciled with the original new work order 11 to ensure a proper electronic invoice is generated.

At Step 110, the generated electronic invoice 138 is automatically sent from the application 30', 62', 64' on the server network device 20 via the communications network 18 back to the requesting network device 22 for payment.

As workers 118 complete work and change new project database records, the application 30', 62', 64' sends a notification via email or facsimile indicating that the tasks associated with that new work project have changed. The application 30', 62', 64' automatically analyzes the records and when certain criteria are met (as defined by users) the application 30', 62', 64' will generate an invoice by comparing the record to user defined criteria and return a result of which billing items are applicable. The application 30', 62', 64' will generate an invoice based on these criteria automatically.

In one embodiment workers 118 have the capability of defining a high profile location on the electronic map using a grid system. Each Project is then compared to the high profile locations programmatically and the records are updated to identify if there it is a high profile location or not. As worker's 118 complete the work associated with projects a grid system is updated to show the work that was completed. The grid is color coded to indicate the result of the project that was performed.

The application 30', 62', 64' automatically analyzes all of the database 20' records and automatically updates the grid. There is also a feature in the application 30', 62', 64' to update based on the type of work being received and workers 118 can manually update the grid system to determine when future records that are received are compared to the grid system and a result is stored as part of the project record.

This process is intended to analyze the work being completed by the users and gain accuracy and efficiency by not dispatching users to areas that have minimal work. This part of the application 30', 62', 64' can also be used to monitor result of a sales organization as an example. They can define a targeted territory and automatically update based on the sales that are received to show how effective a campaign was in a particular region of the map.

Analytics are collected and stored for the new project and the worker who completed the new project. By recording the results of the projects, worker 118 time and locations a series of reports is automatically generated by the application 30', 62', 64' showing management workers the productivity and performance of the workers and providing essential intelligence reporting to managing the open projects.

Basic work project information can be parsed from database 20'. This provides a new business with several solutions to operate their business. The new business may set up territories so that its employees (users/workers) then receive automatic assignment of any work within that territory. The new business may then see and track the status of each project.

In one embodiment, the application 30', 62', 64' includes an automatic mirror process which makes a secondary copy of the database 20' data onto another server network device 22, 24, several times per hour. There is also a process in place to view the archived information and send it back to the main operational database in the event data is lost or corrupted.

Figure 8:
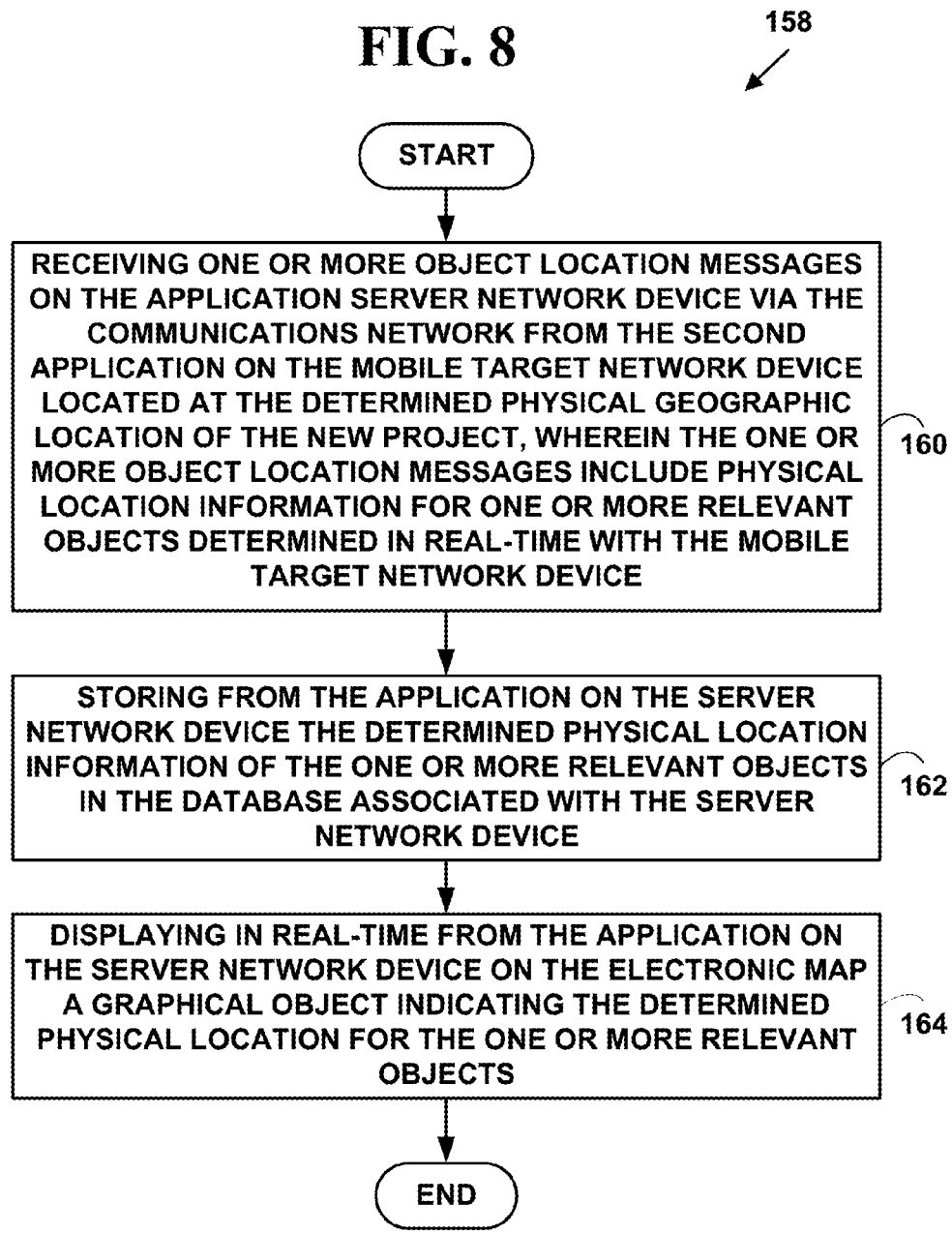
FIG. 8 is a flow diagram illustrating a method for automated work project management.

FIG. 8 is a flow diagram illustrating a Method 158 for automated work project management. At Step 160, one or more object location messages are received on the application on the server network device via the communications network from the second application on the mobile target network device located at the determined physical geographic location of the new project. The one or more object location messages include physical location information for one or more relevant objects determined in real-time with the mobile target network device. At Step 162, the application on the server network device stores determined physical location information of the one or more objects in the database associated with the server network device. At Step 164, the application on the server network device displays in real-time on the electronic map a graphical object indicating the determined physical location for the one or more relevant objects.

Figure 9:
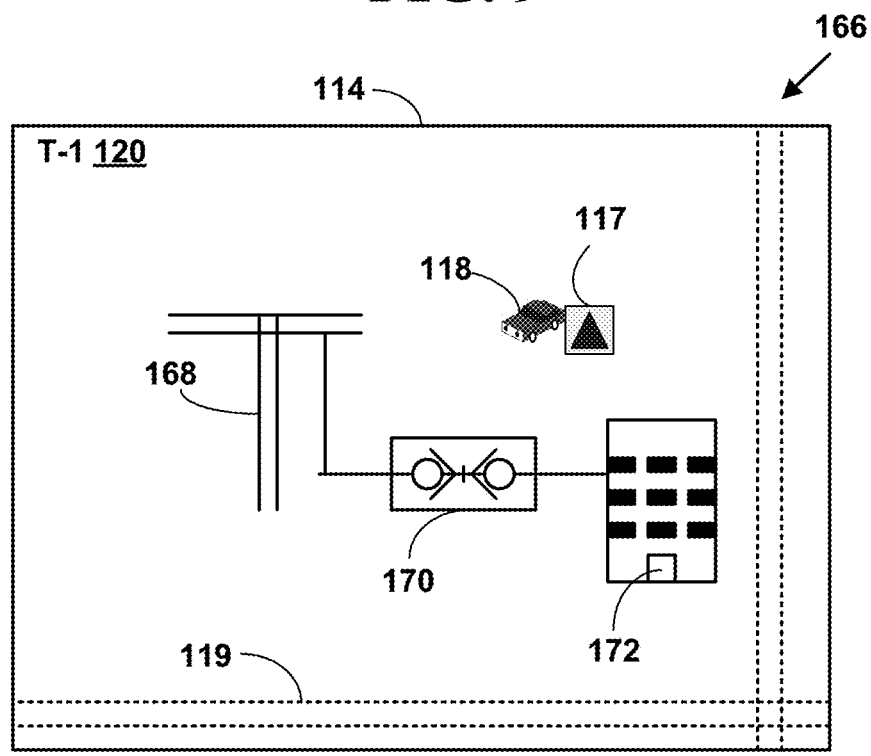
FIG. 9 is a block diagram illustrating additional details of the method of FIG. 8.

FIG. 9 is a block diagram 166 illustrating additional details of Method 158 of FIG. 8.

Method 158 is illustrated with one exemplary embodiment. However, the present invention is not limited to this embodiment and other embodiments can also be used to practice the invention.

In such an exemplary embodiment at Step 160 one or more object location messages are received on the application 30', 62', 64' on the server network device 20 via the communications network 18 from the second application 30, 62, 64 on the mobile target network device 14 located at the determined physical geographic location of the new project. The one or more object location messages include physical location information for one or more relevant objects determined in real-time with the mobile target network device 14.

For example, a worker 118 at the determined physical geographic location of the new project may have a new work order 11 to install a new telephone line. The worker 118 sends GPS locations and photographs and/or video in separate messages using graphical buttons 152 and 154 of GUI 114 (FIG. 7) of a telephone pole 168 (FIG. 9), a service closet 170 and a building entrance 172 at Step 160.

At Step 162, the application 30', 62', 64' on the server network device 20 stores determined physical location information of the one or more objects in the database 20' associated with the server network device 20. Such data is additional analytics that are used for current and future projects.

At Step 164, the application 30', 62', 64' on the server network device 20 displays in real-time on the electronic map 114 a graphical object indicating the determined physical location for the one or more relevant objects 168, 170, 172 (FIG. 9).

FIG. 10 is a flow diagram illustrating a Method 174 for automated work project management. At Step 176, one or more object location messages are sent from the second application on the mobile target network device located at the determined physical geographic location of the new project via the communications network to the application on the server network device. The one or more object location messages include physical location information for one or more relevant objects determined in real-time with the mobile target network device. At Step 178, one or more digital photographs are sent from the second application on the mobile target network device located at the determined physical geographic location of the new project via the communications network to the application on the server network device. At Step 180, the second application on the mobile target network device displays in real-time the electronic map including one or more new graphical objects indicating the determined physical location for each of the one or more relevant objects.

Method 174 is illustrated with one exemplary embodiment. However, the present invention is not limited to this embodiment and other embodiments can also be used to practice the invention.

In such an exemplary embodiment at Step 176, one or more object location messages are sent from the second application 30, 62, 64 on the mobile target network device 12 located at the determined physical geographic location of the new project via the communications network 18 to the application 30', 62', 64' on the server network device 20. The one or more object location messages include physical location information for one or more relevant objects (e.g., 168, 170, 172, etc.) determined in real-time with the mobile target network device 12.

At Step 178, one or more digital photographs 130, 132 are sent from the second application 30, 64, 64 on the mobile target network device 12 located at the determined physical geographic location of the new project via the communications network 18 to the application 30', 62', 64' on the server network device 20.

At Step 180, the second application 30, 62, 64 on the mobile target network device 12 displays in real-time the electronic map 114 including one or more new graphical objects 168, 170, 172 indicating the determined physical location for each of the one or more relevant objects.

The second application 30, 62, 64 on the mobile target network devices provides access to database 20' via the communications network 18 to download data from the server network device 20 and store it locally on mobile target network device 12.

FIG. 11 is a flow diagram illustrating a Method 182 for automated work project management. At Step 184, the new electronic work order is securely received on the application on the server network device via the communications network from the requesting network device, wherein the electronic work order includes the new project to be completed. At Step 186, the application on the server network device queries the database associated with the server network device to determine if the new work order can be completed at the determined physical geographic location. If not, at Step 188, the new work order is canceled or adjusted based on the database query. At Step 190, the application on the server network device securely sends an adjust message via the communications network back to the requesting network device indicating the new work order has been adjusted or canceled.

Method 182 is illustrated with one exemplary embodiment. However, the present invention is not limited to this embodiment and other embodiments can also be used to practice the invention.

At Step 184, the new electronic work order 11 is securely received on the application 30', 62', 64' on the server network device 20 via the communications network 18 from the requesting network device (12, 14, 16, 22, 24, etc.) the electronic work order includes the new project to be completed.

At Step 186, the application 30', 62', 64' on the server network device 20 queries the database 20' associated with the server network device 20 to determine if the new work order can be completed at the determined physical geographic location 117.

If not, at Step 188, the new work order 11 is canceled or adjusted based on the database query.

At Step 190, the application 30', 62', 64' on the server network device 20 securely sends an adjust message via the communications network 18 back to the requesting network device (12, 14, 16, 22, 24, etc.) indicating the new work order 11 has been adjusted or canceled.

If the new work order can be completed, at Step 192, Method 80 is called at Step 84 and the remaining steps of Method 80 are executed as is discussed above.

For example, the application 30', 62', 64' can automatically determine based on the database query if the work should be dispatched to a worker 118 or not, can automatically modify or close the new work assignment, automatically send a notification and generate an invoice.

In this example if a utility has only aerial lines in an area and no underground lines and a new work order 11 was received to place an underground line in this area the database query would be used to determine if the new work order should be modified or canceled. The new work order 11 may be modified if a mistake was made about the location of existing lines in the area.

However, if the new work order 11 was indeed for a new underground line, the new work order would not be modified or canceled. In such a situation, the database 20' would be updated to reflect the location of new underground lines the electronic map 114 would be updated in real-time to also reflect the change.

However, if the new work order included a project came in to mark an underground line and it was in an area with no underground lines and only aerial lines, then the new work order will be automatically canceled by the application 30', 62', 64'.

The methods and system described herein provide at least the following, advantages of the prior art, including, but not limited to: (1) Integration of GPS services to manage project completion not report on fleet or driving conditions; (2) Using GPS to calculate actual job time and to determine if user defined criteria relating the allotted time to complete a project has been exceeded; (3) Notification of management workers of delay and programmatically contacting the delayed user and recording user feedback on what caused the delay; (4) Automatically updating electronic mapping based on work records and new work assignments and performing analysis to determine if workers should be sent to the location of a new assignment or not; (5) Using a smart phone GPS, electronic table GPS or handheld GPS to provide feedback or a sketch of what was performed at a location of work and uploading to GIS or real-time electronic mapping to show all data collected on the mobile device with user defined attributes; (6) Allows workers to geographically sequence the assigned records from their current location with press of a button. If work assignments change it is one press of a button to get a new sequenced route to maximize productivity. This solution has integrated functionality so all worker assigned records are automatically sequenced. (7) Graphical buttons on a smart phone, etc. GUI that a worker can press to automatically send their next location of work to a cellular GPS Navigation without having to type in the work location; and (8) Using text messaging and WR technology with the applications to assist with dispatching workers to work assignments after determining the distance the worker is away from a work assignment by using the GPS and for contacting and interacting with customers; (9) Combines GPS and a workflow solution into one powerful application that can be used in a cloud computing environment; (10) Allows users to track the progress of the work and receive alerts if the project is not proceeding as planned not just identify the vehicle location and powerful reporting capabilities from this information; (11) Creates a savings cycle for workers by learning territories and developing intelligence to compare future work against previous work which can prevent future dispatches or provide real-time results comparing to map and grid system; (12) Creates an easy to use feature to provide work taking place which can be used to update other legacy programs; (13) Uses text messages and IVR to dispatch work and receive confirmation eliminates the need for people to monitor emergency work received and dispatch it; (14) Dispatches work based on job location and vehicle location programmatically reduces the review time and increases response time; (15) Consistently calculates service time specified by the worker and the mileage and drive time it takes to complete assigned work programmatically and sending alerts if a worker has too much or too little work; and (16) Providing workers capability to geographically sequence their work assignments from their current vehicle which reduces travel time and saves fuel and other resources.

The methods and systems described herein provides for a total end to end business solution that will receive a data relating to a project, allow dispatching a job in a territory, allow quality assurance to be included as part of the dispatch, automatically generate a bill for the project, and provide feedback to the business on improving its product or service. The method and system allows users to view project locations, see their worker's progress in real-time against their project locations, perform analysis of the workers as they are completing their projects, track the personnel completing the assignments, provide automatic time sheet and payroll management, provide reporting on productivity, provide automatic billing process, analyze work and call workers if certain criteria is met, allow workers to take GPS measurements of the work performed and translate that data back to a master database, provide analytics of work performed to determine if a user should go to the location in the future if additional projects are received in that location.

Automated Project Management Excavation Mark-Out Verification

In most states, allowing below the surface excavation is a problem because underground infrastructure components must be properly marked before excavation to avoid damage.

A crucial step in ensuring a proper mark out starts with the mark-out request. An accurate and complete mark out request reduces the time it takes for an underground facility operator to respond to a mark out request. It also reduces the possibility of requesting a mark out for the wrong location.

There are a number of was to submit a mark out request for excavation. One of the methods is using a web portal allowing an excavator to fill out the excavation request on line. The excavator logs into the web site, fills out the minimal information required including a location for the excavation and manually picks map grids that overlay the location where the excavation is proposed.

Mistakes are often made when a user enters location information for the proposed excavation and when manually selecting map grids that overlay the location where the excavation is proposed.

Figure 12B:
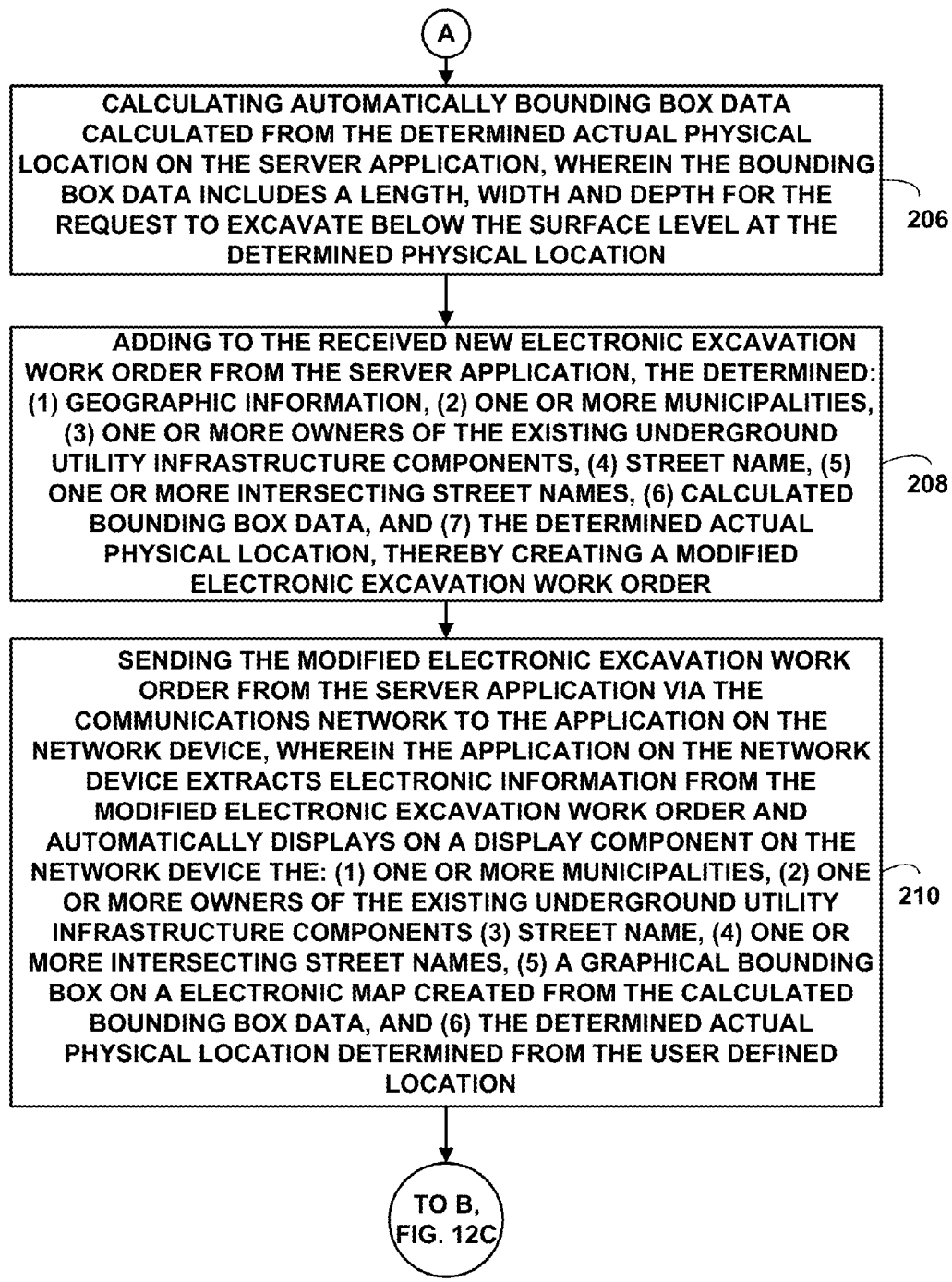
Figure 12C:
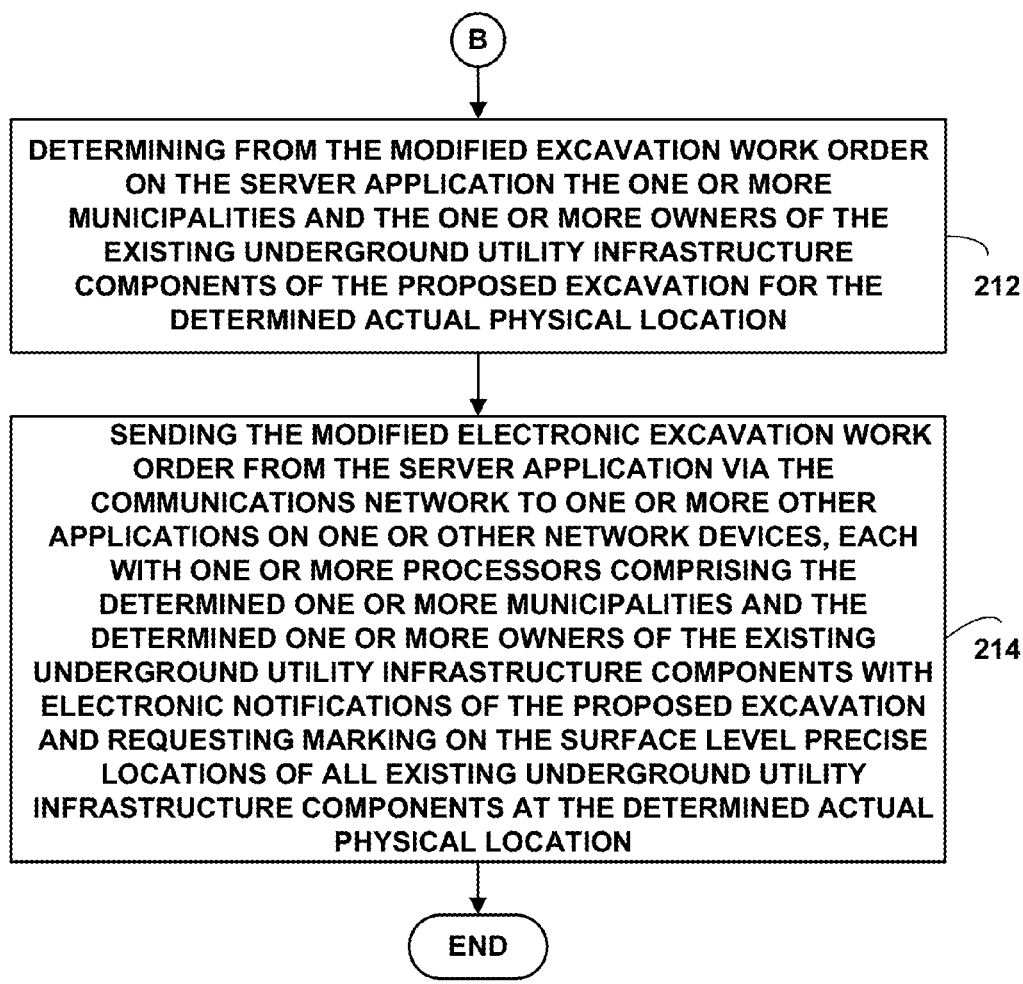

FIGS. 12A, 12B and 12C are a flow diagram illustrating a Method 194 for automated project management excavation mark-out verification.

Figure 13:
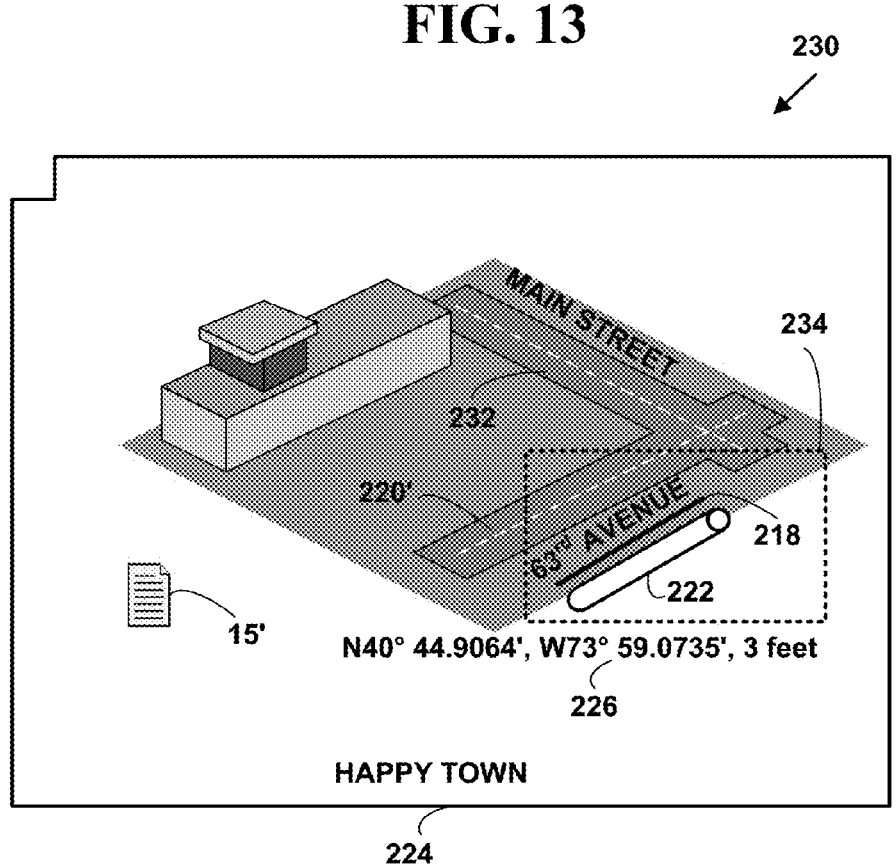
FIG. 13 is a block diagram illustrating exemplary excavation mark-out verification.

FIG. 13 is a block diagram 230 illustrating exemplary excavation mark-out verification.

Figure 14:
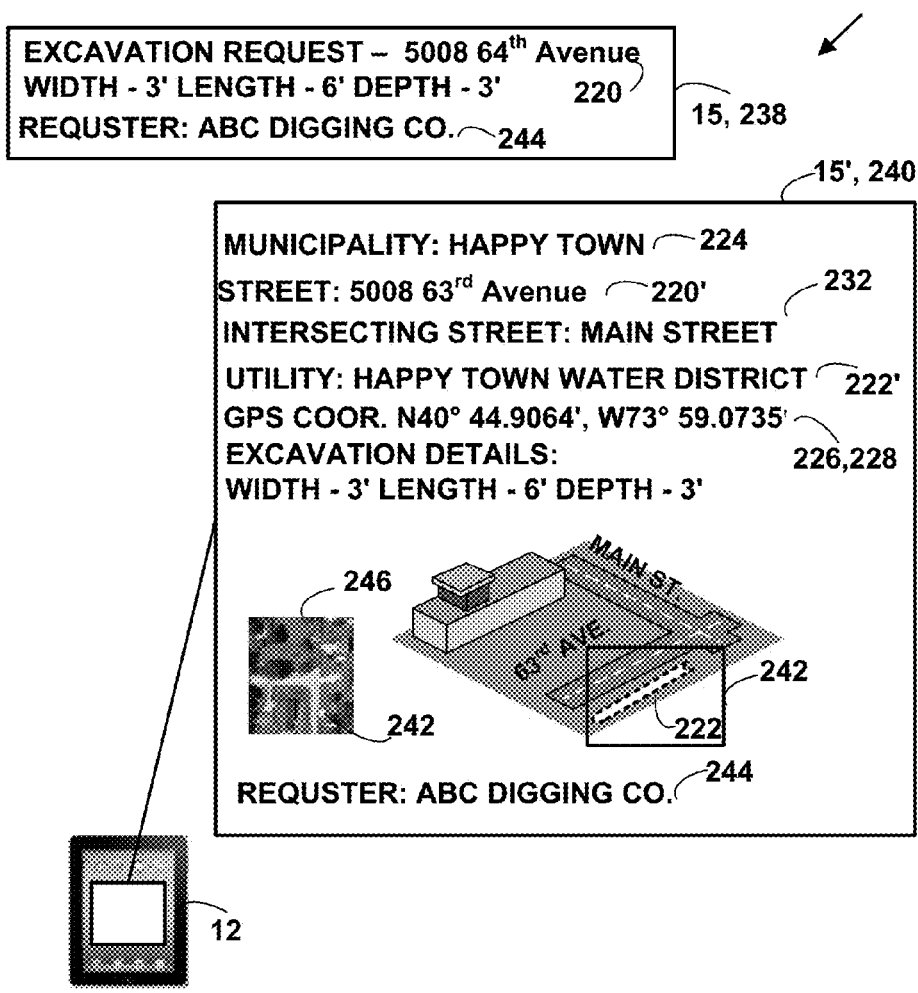
FIG. 14 is a block diagram illustrating exemplary excavation mark-out verification.

FIG. 14 is a block diagram 236 illustrating exemplary excavation mark-out verification.

In FIG. 12A at Step 196, a new electronic excavation work order request is received on a server application on a server network device with one or more processors via a communications network from an application on a network device with one or more processors. The new electronic excavation work order includes a request to excavate below a surface level at a user-defined location while avoiding any existing underground utility infrastructure components at the user-defined location. The new electronic excavation work order will cause one or more municipalities to be automatically notified of the request to excavate. The new electronic excavation work order will cause one or more owners of the existing underground utility infrastructure components at the determined actual physical location to be automatically notified of the request to excavate. The new electronic excavation work order will cause the one or more owners of the existing underground utility infrastructure components to mark or have marked, on the surface level precise locations of all existing underground utility infrastructure components at the determined actual physical location. This thereby eliminates a need for a user to correctly determine all required information for the user-defined location, and reduces a possibility of the user requesting markings or excavating at a wrong location not including the determined actual physical location. At Step 198, geographic information is automatically determined for the user-defined location including an actual physical location on the server application with one or more queries to other applications via the communications. At Step 200, one or more municipalities that include the determined physical location are automatically determined on the server application with one or more queries to the other applications via the communications network. At Step 202, determining automatically one or more owners of one or more existing underground utility infrastructure components that include the determined actual physical location on the server application with one or more queries to the other applications via the communications network. At Step 204, a correct street name and one or more name of one or more other streets intersecting the determined street closest to the determined physical location are automatically determined on the server application with queries to other applications via the communications network. In FIG. 12B at Step 206, bounding box data is automatically calculated from the determined physical location on the server application. The bounding box data includes a length, width and depth for the request to excavate below the surface level at the determined physical location. At Step 208, the server application adds to the received new electronic excavation work order, the determined: (1) geographic information, (2) one or more municipalities, (3) one or more owners of the existing underground utility infrastructure components, (4) street name, (5) one or more intersecting street names, (6) calculated bounding box data, and (7) the determined actual physical location, thereby creating a modified electronic excavation work order. At Step 210, the modified electronic excavation work order is sent from the server application via the communications network to the application on the network device. The application on the network device extracts electronic information from the modified electronic excavation work order and automatically displays on a display component on the network device the: (1) geographic information, (2) one or more municipalities, (3) street name, (4) one or more intersecting street names, (5) a graphical bounding box on a electronic map created from the calculated bounding box data, and (6) the determined actual physical location determined from the user defined location. In FIG. 12C at Step 212, the one or more municipalities and the one or more owners of the existing underground utility infrastructure components of the proposed excavation for the determined actual physical location are determined from the modified excavation work order on the server application. At Step 214, the modified electronic excavation work order is sent from the server application via the communications network to one or more other applications on one or other network devices, each with one or more processors comprising the determined one or more municipalities and the determined one or more owners of the existing underground utility infrastructure components with electronic notifications of the proposed excavation and requesting marking on the surface level precise locations of all existing underground utility infrastructure components at the determined actual physical location.

Method 196 is illustrated with one exemplary embodiment. However, the present invention is not limited to this embodiment and other embodiments can also be used to practice the invention.

In such an exemplary embodiment, in FIG. 12A at Step 196, a new electronic excavation work order request 15 (FIG. 1) is received on a server application 30, 62' on a server network device 20 with one or more processors via a communications network 18, 18' from an application 30, 62 on a network device 12, 14, 16 (e.g., 12, etc.) with one or more processors. The new electronic excavation work order 15 includes a request (e.g., from requester ABC Digging Co. 244 (FIG. 14), etc.) to excavate below a surface level 218 at a user-defined location 220 (e.g. $64^{th}$ Avenue, etc.) while avoiding any existing underground utility infrastructure components 222 (e.g., pipe, etc.) at the user-defined location 220. The new electronic excavation work order 15 will cause one or more municipalities 224 (e.g., Happy Town, etc.) to be automatically notified of the request to excavate at an actual physical location 226 (e.g., 5008 $63^{rd}$ Avenue, N40° 44.9064', W73° 59.0735', etc.) determined for the user-defined location 220. The new electronic excavation work order 15 will cause one or more owners 222' of the existing underground utility infrastructure components 222 at the determined actual physical location 226 to be automatically notified of the request to excavate. The new electronic excavation work order 15 will cause the one or more owners 222' of the existing underground utility infrastructure components 222 to mark or have marked, on the surface level 218 precise locations of all existing underground utility infrastructure components 222 at the determined actual physical location 226. This thereby eliminates a need for a user to correctly determine all required information for the new electronic excavation work order 15, and reduces a possibility of the user requesting markings or excavating at a wrong location not including the determined actual physical location 226.

In one embodiment, the existing underground utility infrastructure components include, but are not limited to, water, gas, electric, sanitary sewer, waste water, drainage, heating, ventilation air conditioning (HVAC), or communications network, or structural, underground utility infrastructure components.

However, the present invention is not limited to the utility infrastructure components described and more, fewer or other types of utility infrastructure components can be used to practice the invention.

In one embodiment, Methods 80 (FIG. 5) and/or 182 (FIG. 11) are used at Step 196 and/or with or after other steps of Method 194 to further verify the new electronic excavation work order request 15 can be completed.

However, the present invention is not limited to this embodiment and the invention including Method 196 can be practiced without Methods 80 and/or 182.

At Step 198, geographic information 228 (FIG. 1) is automatically determined for the user-defined location 220. Determining the geographic information 228 includes determining an actual physical location 226 (e.g., N40° 44.9064', W73° 59.0735', etc.) of the proposed excavation site, on the server application 30',62' with one or more queries to other applications via the communications network 18,18'.

In one embodiment, the geographic information 228 includes, but is not limited to, geographic information includes Global Positioning Satellite (GPS) data such as longitude, latitude, elevation, depth, etc. (e.g., N40° 44.9064', W73° 59.0735', etc.), Geo-coding data, electronic map data, three-dimensional (3D) (X, Y, Z) geo-coordinate data, or mobile phone cell tower location information data. However, the present invention is not limited to the geographic information described and more, fewer or other types of geographic information can be used to practice the invention.

In one embodiment, the one or more queries include one or more queries to one or more local databases 20' associated with the server network device 20. In another embodiment, the one or more queries include one or more queries to one or more remote databases 22', 24', 26' or remote databases such as, federal, state, county, local databases, remote websites, GOOGLE search engine, other search engines, GOOGLE MAPS, MAPQUEST, etc.

However, the present invention is not limited to the one or more queries described and more, fewer or other types of queries can be used to practice the invention.

At Step 200, one or more municipalities 224 (FIGS. 1 and 13) (e.g. HAPPY TOWN, etc.) that include the determined actual physical location 226 are automatically determined on the server application 30', 62' with one or more queries to the other applications via the communications network 18.

In one embodiment, the one or more queries include one or more queries to one or more local databases 20' associated with the server network device 20. In another embodiment, the one or more queries include one or more queries to one or more remote databases 22', 24', 26' or remote databases such as, federal, state, county, local databases, remote websites, GOOGLE search engine, other search engines, GOOGLE MAPS, MAPQUEST, etc.

However, the present invention is not limited to the one or more queries described and more, fewer or other types of queries can be used to practice the invention.

At Step 202, one or more owners 222' (e.g., Happy Town Water District 222' owner of water pipe 222, FIG. 14, etc.) of one or more existing underground utility infrastructure components 222 that include the determined actual physical location 226 on the server application 30', 62' with one or more queries to the other applications 30, 62 via the communications network 18, 18'.

In one embodiment, the one or more queries include one or more queries to one or more local databases 20' associated with the server network device 20. In another embodiment, the one or more queries include one or more queries to one or more remote databases 22', 24', 26' or remote databases such as, federal, state, county, local databases, remote websites, GOOGLE search engine, other search engines, GOOGLE MAPS, MAPQUEST, etc.

However, the present invention is not limited to the one or more queries described and more, fewer or other types of queries can be used to practice the invention.

At Step 204, a street name 220' (e.g., 5008 $63^{rd}$ Avenue, etc.) of a street closest to the determined physical location 226 and one or more names of one or more other streets 232 (e.g., FIG. 13, Main Street, etc.) intersecting the correct street 220' closest to the determined actual physical location 226 are automatically determined on the server application 30', 62' with one or more queries to the other applications via the communications network 18. In this example, the original street name 220 of "5008 64$^{th}$ Avenue" (FIG. 1), which was incorrectly entered by a user is automatically corrected to the correct street name 220' of "5008 63$^{rd}$ Avenue" (FIGS. 13, 14).

In one embodiment the determined street name 220' includes a street name and street number (e.g. 5008 63$^{rd}$ Avenue, etc.). In another embodiment, the determined street name 220' only includes a street name (e.g., 63$^{rd}$ Avenue, etc.). However, the present invention is not limited to the street names described and more, fewer or other types of queries can be used to practice the invention.

In one embodiment, the one or more queries include one or more queries to one or more local databases 20' associated with the server network device 20. In another embodiment, the one or more queries include one or more queries to one or more remote databases 22', 24', 26' or remote databases such as, federal, state, county, local databases, remote websites, GOOGLE search engine, other search engines, GOOGLE MAPS, MAPQUEST, etc.

However, the present invention is not limited to the one or more queries described and more, fewer or other types of queries can be used to practice the invention.

In one embodiment, the determined street name 220' is correct and identical to a street name provided by the user. In another embodiment, the street name supplied by the user is incorrect (e.g., 5008 64$^{th}$ Avenue, etc.). In such an embodiment, any incorrect street name is automatically corrected by server application 30', 62' to a correct street name (e.g., 5008 63$^{rd}$ Avenue, etc.).

In many instances, the street name provided by a user is incorrect. For example, the user may provide a street name of "5008 64$^{th}$ Avenue" but the actual street name is "5008 63$^{rd}$ Avenue." In addition, in many instances the street name provided by the user may be a vanity street name and not the actual street name. For example, the user may provide a vanity street name of "1 Waterfront Plaza," when the actual street name is "5008 63$^{rd}$ Avenue."

In FIG. 12B at Step 206, bounding box 234 data (FIG. 13) is automatically calculated from the determined actual physical location 226 on the server application 30', 62'. The bounding box 234 data includes a length, width, depth and other information for the request to excavate below the surface level 218 at the determined actual physical location 226 (bounding box 234 from bounding box 234 data not drawn to scale in FIG. 13).

At Step 208, the server application 30', 62' adds to the received new electronic excavation work order 15, the determined: (1) geographic information 228, (2) one or more municipalities 224, (3) one or more owners 222' of the existing underground utility infrastructure components 222, (4) street name 220, (5) one or more intersecting street names 232, (6) calculated bounding box data 234, and (7) the determined actual physical location 226, thereby creating a modified electronic excavation work order 15'

At Step 210, the modified electronic excavation work order 15' is sent from the server application 30', 62' via the communications network 18, 18' to the application 30, 62 on the network device 12. The application 30, 62' on the network device 12 extracts electronic information from the modified electronic excavation work order 15' and automatically displays on a display component 238 on the network device 12 the: (1) geographic information 228, (2) one or more municipalities 224, (3) street name 220, (4) one or more intersecting street names 232, (5) a graphical bounding box 242 (FIG. 14) on an electronic map created from the calculated bounding box 234 data, and (5) the determined actual physical location 226 determined from the user defined location.

In one embodiment, the electronic maps includes a two-dimensional (2D) graphical map (FIGS. 13 and 14, etc.), three-dimensional (3D) graphical map, or a photographic map 246 (FIG. 14, etc.) including one or more digital photographs.

However, the present invention is not limited to the electronic maps described and more, fewer or other types of electronic maps can be used to practice the invention.

FIG. 14 illustrates exemplary content of an original electronic excavation work order 15, 238 sent by the ABC Digging Company from application 30, 62 on network device 12 to the server application 30, 62 on server network device 12 and the modified electronic excavation work order 15', 240 as received and displayed on the network device 12 from the server network device in the requester 244 (e.g., ABC Digging Company, etc.).

However, the present invention is not limited to the display information described and illustrated and more, fewer or other types of display information can be used to practice the invention.

In FIG. 12C at Step 212, the one or more municipalities 224 and the one or more owners 222' of the existing underground utility infrastructure components 222 of the proposed excavation for the determined actual physical location 226 are determined from the modified excavation work order 15' on the server application 30', 62'.

At Step 214, the modified electronic excavation work order 15' is sent from the server application 30', 62' via the communications network 18, 18' to one or more other applications 30, 62, 30', 62' on one or other network devices 12, 14, 16, 22, 24, 26, each with one or more processors comprising the determined one or more municipalities 224 and the determined one or more owners 222' of the existing underground utility infrastructure components 222 with electronic notifications of the proposed excavation and requesting marking on the surface level 218 precise locations of all existing underground utility infrastructure components 222 at the determined actual physical location 226.

In one embodiment, Method 194 further includes additional Step 215 of: requesting marking on the surface level 218 precise locations of all existing underground utility infrastructure components 222 at the determined actual physical location 226.

However, the present invention is not limited the additional step described and the invention can be practice without additional Step 215.

FIG. 15 is a flow diagram illustrating a Method 250 for automated project management excavation mark-out verification. At Step 252, a new electronic excavation work order request is received on a server application on a server network device with one or more processors via a communications network from an application on a network device with one or more processors. At Step 254, the server application verifies and corrects if necessary, excavation information input by a user into the new electronic excavation work order. At Step 256, the server application determines one or more municipalities and one or more owners of the existing underground utility infrastructure components of the proposed excavation. At Step 258, the server application creates a modified electronic excavation work order from including the verified and corrected excavation information and the determined one or more municipalities and one or more owners of the existing underground utility infrastructure components of the proposed excavation. At Step 260, the server application sends the modified electronic excavation work order via the communications network to one or more other applications on one or other network devices, each with one or more processors, comprising the determined one or more municipalities and the determined one or more owners of the existing underground utility infrastructure components with electronic notifications of the proposed excavation and requesting marking on the surface level precise locations of all existing underground utility infrastructure components.

Method 250 is illustrated with one exemplary embodiment. However, the present invention is not limited to this embodiment and other embodiments can also be used to practice the invention.

In such an exemplary embodiment, at Step 252, a new electronic excavation work order request 15 is received on a server application 30', 62' on a server network device 20 with one or more processors via a communications network 18, 18' from an application 30, 62, 30', 62' on a network device 12, 14, 16, 22, 24, 26 (e.g., 12, etc.) with one or more processors.

At Step 254, the server application 30', 62' verifies and corrects if necessary, excavation information input by a user into the new electronic excavation work order 15.

In one embodiment, Methods 80 (FIG. 5) and/or 182 (FIG. 11) are used at Step 254 and/or with or after other steps of Method 250 to further verify the new electronic excavation work order request 15 can be completed.

However, the present invention is not limited to this embodiment and the invention including Method 250 can be practiced without Methods 80 and/or 182.

At Step 256, the server application 30', 62', determines one or more municipalities 224 and one or more owners 222' of the existing underground utility infrastructure components 222 of the proposed excavation.

At Step 258, the server application 30', 62' creates a modified electronic excavation work order 15 from including the verified and corrected excavation information and the determined one or more municipalities 224 and one or more owners 222' of the existing underground utility infrastructure components 222 of the proposed excavation.

At Step 260, the server application 30, 62' sends the modified electronic excavation work order 15' via the communications network 18, 18' to one or more other applications 30, 62, 30', 62' on one or other network devices 12, 14, 16, 22, 24, 26, each with one or more processors, comprising the determined one or more municipalities 224 and the determined one or more owners 222' of the existing underground utility infrastructure components 222 with electronic notifications of the proposed excavation and requesting marking on the surface level precise locations of all existing underground utility infrastructure components 222.

The methods and systems described herein provide automated excavation mark-out verification of a user request to excavate at a desired location. User-defined excavation information is automatically verified and corrected if necessary. One or more municipalities and one or more owners of the existing underground utility infrastructure components are automatically notified of the request to excavate at the user-defined location. The method and system eliminate a need for a user to correctly determine all required information for user requested excavation, and reduces a possibility of the user requesting markings or excavating at a wrong location.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

We claim:

1. A method for automated work project management excavation mark-outs, comprising:
   receiving a new electronic excavation work order request on a server application on a server network device with one or more processors via a communications network from an application on a network device with one or more processors,
   wherein the new electronic excavation work order includes a request to excavate below a surface level at a user-defined location while avoiding any existing underground utility infrastructure components at the user-defined location,
   wherein the new electronic excavation work order will cause one or more municipalities to be automatically notified of the request to excavate;
   wherein the new electronic excavation work order will cause one or more owners of the existing underground utility infrastructure components at the determined actual physical location to be automatically notified of the request to excavate, and
   wherein the new electronic excavation work order will cause the one or more owners of the existing underground utility infrastructure components to mark or have marked, on the surface level precise locations of all existing underground utility infrastructure components at the determined actual physical location,
   thereby eliminating a need for a user to correctly determine all required information for the excavation, and
   thereby reducing a possibility of the user requesting markings or excavating at a wrong location not including the determined actual physical location;
   determining automatically on the server application geographic information for the user-defined location thereby determining the actual physical location with one or more queries to other applications via the communications network;

determining automatically on the server application one or more municipalities that include the determined actual physical location with one or more queries to the other applications via the communications network;

determining automatically on the server application one or more owners of one or more existing underground utility infrastructure components that include the determined actual physical location with one or more queries to the other applications via the communications network;

determining automatically on the server application a street name of a street closest to the determined actual physical location and one or more names of one or more other streets intersecting the determined street closest with one or more queries to the other applications via the communications network;

calculating automatically on the server application bounding box data calculated from the determined actual physical location, wherein the bounding box data includes a length, width and depth for the request to excavate below the surface level at the determined physical location;

adding on the server application to the received new electronic excavation work order the determined: (1) geographic information, (2) one or more municipalities, (3) one or more owners of the existing underground utility infrastructure components, (4) street name, (5) one or more intersecting street names, (6) calculated bounding box data, and (7) the determined actual physical location, thereby creating a modified electronic excavation work order;

sending order from the server application the modified electronic excavation work via the communications network to the application on the network device, wherein the application on the network device extracts electronic information from the modified electronic excavation work order and automatically displays on a display component on the network device the: (1) one or more municipalities, (2) one or more owners of the existing underground utility infrastructure components (3) street name, (4) one or more intersecting street names, (5) a graphical bounding box on an electronic map created from the calculated bounding box data, and (6) the determined actual physical location determined from the user defined location;

determining on the server application from the modified excavation work order the one or more municipalities and the one or more owners of the existing underground utility infrastructure components of the proposed excavation for the determined actual physical location; and sending from the server application the modified electronic excavation work order via the communications network to one or more other applications on one or other network devices, each with one or more processors comprising the determined one or more municipalities and the determined one or more owners of the existing underground utility infrastructure components with electronic notifications of the proposed excavation and requesting marking on the surface level precise locations of all existing underground utility infrastructure components at the determined actual physical location.

2. A non-transitory computer readable medium having stored therein a plurality of instructions for causing one or more processor on one or more network devices to execute the steps of:

receiving a new electronic excavation work order request on a server application on a server network device with one or more processors via a communications network from an application on a network device with one or more processors, wherein the new electronic excavation work order includes a request to excavate below a surface level at a user-defined location while avoiding any existing underground utility infrastructure components at the user-defined location, wherein the new electronic excavation work order will cause one or more municipalities to be automatically notified of the request to excavate;

wherein the new electronic excavation work order will cause one or more owners of the existing underground utility infrastructure components at the determined actual physical location to be automatically notified of the request to excavate, and wherein the new electronic excavation work order will cause the one or more owners of the existing underground utility infrastructure components to mark or have marked, on the surface level precise locations of all existing underground utility infrastructure components at the determined actual physical location, thereby eliminating a need for a user to correctly determine all required information for the excavation, and thereby reducing a possibility of the user requesting markings or excavating at a wrong location not including the determined actual physical location;

determining automatically on the server application geographic information for the user-defined location thereby determining the actual physical location with one or more queries to other applications via the communications network;

determining automatically on the server application one or more municipalities that include the determined actual physical location with one or more queries to the other applications via the communications network;

determining automatically on the server application one or more owners of one or more existing underground utility infrastructure components that include the determined actual physical location with one or more queries to the other applications via the communications network;

determining automatically on the server application a street name of a street closest to the determined actual physical location and one or more names of one or more other streets intersecting the determined street closest with one or more queries to the other applications via the communications network;

calculating automatically on the server application bounding box data calculated from the determined actual physical location, wherein the bounding box data includes a length, width and depth for the request to excavate below the surface level at the determined physical location;

adding on the server application to the received new electronic excavation work order the determined: (1) geographic information, (2) one or more municipalities, (3) one or more owners of the existing underground utility infrastructure components, (4) street name, (5) one or more intersecting street names, (6) calculated bounding box data, and (7) the determined actual physical location, thereby creating a modified electronic excavation work order;

sending order from the server application the modified electronic excavation work via the communications network to the application on the network device, wherein the application on the network device extracts electronic information from the modified electronic excavation work order and automatically displays on a display component on the network device the: (1) one or more municipalities, (2) one or more owners of the existing underground utility infrastructure components (3) street name, (4) one or more intersecting street names, (5) a graphical bounding box on an electronic map created from the calculated bounding box data, and (6) the determined actual physical location determined from the user defined location;

determining on the server application from the modified excavation work order the one or more municipalities and the one or more owners of the existing underground utility infrastructure components of the proposed excavation for the determined actual physical location; and sending from the server application the modified electronic excavation work order via the communications network to one or more other applications on one or other network devices, each with one or more processors comprising the determined one or more municipalities and the determined one or more owners of the existing underground utility infrastructure components with electronic notifications of the proposed excavation and requesting marking on the surface level precise locations of all existing underground utility infrastructure components at the determined actual physical location.

3. The method of claim 1 wherein the communications network includes a cloud communications network comprising one or more public networks, one or more private networks, one or more community networks or one or more hybrid networks and wherein the cloud communications network includes on-demand automatic secure automated project management mark-out services and broadband network access, resource pooling, rapid elasticity and measured network services for cloud automated work project management excavation marking services.

4. The method of claim 3 wherein the server application on the server network device, the application on the network device and the other applications on the other network devices provide a cloud computing Infrastructure as a Service (IaaS), a cloud computing Platform, as a Service (PaaS) and offers Specific cloud project management excavation verification services as a Service (SaaS) including a cloud software service, wherein the IaaS, PaaS and SaaS include one or more of automated work project management excavation verification services comprising networking, storage, server network device, virtualization, operating system, middleware, run-time, data or application services, or plural combinations thereof, on the cloud communications network.

5. The method of claim 1 wherein communications via the communications network are sent and received securely using a Wireless Encryption Protocol (WEP), Wireless-Wi-Fi Protected Access (WPA), Robust Security Network (RSN), Advanced Encryption Standard (AES), Data Encryption Standard (DES), Triple Data Encryption Standard (3DES), Secure Hash Algorithm (SHA), Message Digest-5 (MD-5), Electronic Code Book (ECB), Diffie and Hellman (DH), HyperText Transport Protocol Secure, (HTTPs), Secure Sockets Layer (SSL), or a Transport Layer Security (TLS) security method.

6. The method of claim 1 wherein server network device, network device and other network devices include wireless networking interfaces comprising a Worldwide Interoperability for Microwave Access (WiMax) wireless networking interface with 4th generation (4G) wireless speeds or faster, for communicating with the communications network.

7. The method of claim 1 wherein the application on the network device includes a smart application for a smart phone or a tablet computer network device.

8. The method of claim 1 further comprising:
displaying in real-time from the application on the server network device or on the one or more other applications on the other network devices, an electronic map on a multi-windowed graphical user interface for viewing the modified electronic excavation work order.

9. The method of claim 1 wherein the electronic map includes a two-dimensional (2D) graphical map, three-dimensional (3D) graphical map, or a photographic map including a plurality of digital photographs.

10. The method of claim 9 wherein the determining steps include making the one or more queries from the server application with Hyper Text Markup Language (HTML), eXtensible Markup Language (XML), REpresentational State Transfer (REST), Simple Object Access Protocol (SOAP), Lightweight Directory Access Protocol (LDAP) or Application Programming Interface (API) queries.

11. The method of claim 9 wherein the determining steps include making the one or more queries from the server application via the communications network to one or more databases local to the server network device or one or more databases remote to the server network device.

12. The method of claim 1 wherein the geographic information includes Global Positioning Satellite (GPS) data, Geo-coding data, electronic map data, three-dimensional (3D) (X, Y, Z) geo-coordinate data, or mobile phone cell tower location information data.

13. The method of claim 1 wherein the existing underground utility infrastructure components include, water, gas, electric, sanitary sewer, waste water, drainage, heating, ventilation, air conditioning (HVAC), or communications network, or structural, underground utility infrastructure components.

14. The method of claim 1 further comprising:
requesting marking on the surface level precise locations of all existing underground utility infrastructure components at the determined actual physical location.

15. The method of claim 1 wherein the one or more queries to other applications via the communications network include one or more queries to one or more local databases, remote databases including federal, state, county, local government databases, remote web-sites, GOOGLE search engine, other search engines GOOGLE MAPS, or MAPQUEST.

16. The method of claim 1 further comprising:
querying from the server application on the server network device a database associated with the server network device to determine if the new electronic excavation work order request can be completed at the determined actual physical geographic location, and if not,
adjusting or canceling the new electronic excavation work order request based on the database query; and
sending an adjustment message from the server application on the server network device via the communications network back to the application on the network device indicating the new electronic excavation work order request has been adjusted or canceled.

17. The method of claim 1 further comprising:
receiving on the application on the network device via the communications network from the server application on the server network device, the modified electronic excavation work order;
extracting from the application electronic information from the modified electronic excavation work order including the: (1) one or more municipalities, (2) one or more owners of the existing underground utility infrastructure components (3) street name, (4) one or more intersecting street names, (5) a graphical bounding box on an electronic map created from the calculated bounding box data, and (6) the determined actual physical location determined from the user defined location; and
automatically displaying from the application on the display component on the network device the extract electronic information.

18. The method of claim 1 further comprising:
sending a new electronic excavation work order request from the application on the network device with one or more processors via the communications network to the server application on the server network device,
wherein the new electronic excavation work order includes a request to excavate below the surface level at the user-defined location while avoiding any existing underground utility infrastructure components at the user-defined location and includes other excavation information input by the user.

19. A system for automated work project management excavation mark-outs, comprising in combination:
a server application in a non-transitory computer readable medium on a server network device with one or more processors;
the non-transitory computer readable medium having stored therein a plurality of instructions:
for receiving a new electronic excavation work order request on a server application on a server network device with one or more processors via a communications network from an application on a network device with one or more processors,
wherein the new electronic excavation work order includes a request to excavate below a surface level at a user-defined location while avoiding any existing underground utility infrastructure components at the user-defined location,
wherein the new electronic excavation work order will cause one or more municipalities to be automatically notified of the request to excavate;
wherein the new electronic excavation work order will cause one or more owners of the existing underground utility infrastructure components at the determined actual physical location to be automatically notified of the request to excavate, and
wherein the new electronic excavation work order will cause the one or more owners of the existing underground utility infrastructure components to mark or have marked, on the surface level precise locations of all existing underground utility infrastructure components at the determined actual physical location,
thereby eliminating a need for a user to correctly determine all required information for the excavation, and
thereby reducing a possibility of the user requesting markings or excavating at a wrong location not including the determined actual physical location;
for determining automatically on the server application geographic information for the user-defined location thereby determining the actual physical location with one or more queries to other applications via the communications network;
for determining automatically on the server application one or more municipalities that include the determined actual physical location with one or more queries to the other applications via the communications network;
for determining automatically on the server application one or more owners of one or more existing underground utility infrastructure components that include the determined actual physical location with one or more queries to the other applications via the communications network;
for determining automatically on the server application a street name of a street closest to the determined actual physical location and one or more names of one or more other streets intersecting the determined street closest with one or more queries to the other applications via the communications network;
for calculating automatically on the server application bounding box data calculated from the determined actual physical location, wherein the bounding box data includes a length, width and depth for the request to excavate below the surface level at the determined physical location;
for adding on the server application to the received new electronic excavation work order the determined: (1) geographic information, (2) one or more municipalities, (3) one or more owners of the existing underground utility infrastructure components, (4) street name, (5) one or more intersecting street names, (6) calculated bounding box data, and (7) the determined actual physical location, thereby creating a modified electronic excavation work order;
for sending order from the server application the modified electronic excavation work via the communications network to the application on the network device,
wherein the application on the network device extracts electronic information from the modified electronic excavation work order and automatically displays on a display component on the network device the: (1) one or more municipalities, (2) one or more owners of the existing underground utility infrastructure components (3) street name, (4) one or more intersecting street names, (5) a graphical bounding box on an electronic map created from the calculated bounding box data, and (6) the determined actual physical location determined from the user defined location;
for determining on the server application from the modified excavation work order the one or more municipalities and the one or more owners of the existing underground utility infrastructure components of the proposed excavation for the determined actual physical location; and
for sending from the server application the modified electronic excavation work order via the communications network to one or more other applications on one or other network devices, each with one or more processors comprising the determined one or more municipalities and the determined one or more owners of the existing underground utility infrastructure components with electronic notifications of the proposed excavation and requesting marking on the surface level precise locations of all existing underground utility infrastructure components at the determined actual physical location.

* * * * *